United States Patent
Saban

(10) Patent No.: US 7,796,021 B2
(45) Date of Patent: Sep. 14, 2010

(54) PROTECTING CHILDREN AND PASSENGERS WITH RESPECT TO A VEHICLE

(76) Inventor: Asher S. Saban, 8 Heinrich Heine Square, 34485 Haifa (IL)

( * ) Notice: Subject to any disclaimer, the term of this patent is extended or adjusted under 35 U.S.C. 154(b) by 140 days.

(21) Appl. No.: 12/284,040

(22) Filed: Sep. 18, 2008

(65) Prior Publication Data

US 2009/0027188 A1    Jan. 29, 2009

Related U.S. Application Data

(63) Continuation of application No. PCT/IL2007/000403, filed on Mar. 28, 2007.

(30) Foreign Application Priority Data

| Mar. 30, 2006 | (IL) | ..................................... 174634 |
| Dec. 31, 2006 | (IL) | ..................................... 180462 |
| Feb. 18, 2007 | (IL) | ..................................... 181390 |

(51) Int. Cl.
B60Q 1/00    (2006.01)

(52) U.S. Cl. .................. 340/438; 340/439; 340/521; 340/522; 340/457.1; 340/573.1; 340/573.4; 701/29; 701/36; 701/45; 701/47

(58) Field of Classification Search ............... 340/438, 340/439, 521, 522, 457.1, 573.1, 573.4; 701/29, 701/36, 45, 47

See application file for complete search history.

(56) References Cited

U.S. PATENT DOCUMENTS

| 6,104,293 | A  * | 8/2000  | Rossi ........................ 340/573.1 |
| 6,489,889 | B1 * | 12/2002 | Smith ........................ 340/457 |
| 7,218,218 | B1 * | 5/2007  | Rogers ........................ 340/522 |
| 2003/0209893 | A1 | 11/2003 | Breed et al. |
| 2004/0232674 | A1 | 11/2004 | Winkler et al. |
| 2005/0040937 | A1 | 2/2005  | Cuddihy et al. |
| 2005/0200465 | A1 | 9/2005  | Fabors et al. |
| 2005/0209755 | A1 | 9/2005  | Sugiura |
| 2006/0033634 | A1 | 2/2006  | Best |
| 2006/0103516 | A1 * | 5/2006 | Zang ........................ 340/457 |
| 2006/0139159 | A1 | 6/2006  | Lee et al. |
| 2006/0226641 | A1 | 10/2006 | Watts |
| 2006/0241836 | A1 | 10/2006 | Kachouh et al. |

OTHER PUBLICATIONS

International Search Report mailed Jun. 16, 2008 in corresponding International Application PCT/IL07/000403.

* cited by examiner

*Primary Examiner*—Tai T Nguyen
(74) *Attorney, Agent, or Firm*—Frishauf, Holtz, Goodman & Chick, P.C.

(57) ABSTRACT

There is provided a system and methods for mitigation of the potential dangers to which at least a child, and passengers, are exposed to prior to, during travel and after travel, when outside and adjacent a vehicle. Potential dangers to which a child is exposed are risks associated with driving and non-driving behavior of the driver, when the child is inside and outside the vehicle, when the vehicle is driven on public roads and on private property grounds, and as a result of deficient of mistaken operation of child and passenger related devices. The system and methods require input commands into an indicator to operate equipment elements aboard the vehicle, including sensors, operable devices and alert systems, and are operative for communication with remote stations, with adjacent-driven vehicles, and with the vehicle owner.

43 Claims, 8 Drawing Sheets

PROTECTING CHILDREN AND PASSENGERS WITH RESPECT TO A VEHICLE

This application is a Continuation of PCT/IL2007/000403 filed Mar. 28, 2007, the priority date of which is claimed herein, and the entire disclosure of which is incorporated herein by reference.

TECHNICAL FIELD

The present invention relates to methods, systems, and devices for protecting a passenger with respect to a vehicle, and more particularly, to means for providing an integrative protection suite, or protection envelope, in response to the complete cycle of operation of a vehicle, for protection of at least a child, and for providing warning when the at least one child is exposed to a potential danger. Pregnant women, disabled persons, and out-of-norm adult passengers are also protected in addition to children.

BACKGROUND ART

It is well known that nowadays passenger safety issues are in the limelight of public attention, and especially so when related to children. Various separate and distinct discrete-issue disclosures have been published but no solution provides an integrative protection suite, or protection envelope, in response to the complete cycle of operation of a vehicle has yet been made available. A few examples out of the many existing patents are cited hereinbelow.

Conventionally, the use of occupant classification sensing and detection systems is divulged separately in various applications addressing child protection. Examples of solutions for separately engaging airbag and seatbelt tensioning devices are found in U.S. Patent Applications Nos. 20030209893, 20060226641, 20040232674, and 20050209755. A crash notification system is found in U.S. Patent Application No. 20050040937, and further single-issue disclosures are divulged in U.S. Patent Applications Nos. 20060241836, 20050200465, 20060033634, and 20060139159.

The motor vehicle child-safety paradigm is a reflection of the current approach towards protecting a child with respect to a set of potential hazards paradigmatically treated as unrelated hazards. Hazard mitigation is carried out separately and independently. Hazard mitigation, uncoupled in time and event domains, points to and treats a specific scenario of the hazard. The current approach treats child protection in a piecemeal fashion, which probably reduces effectiveness and raises expenditure of "child safety content" per vehicle. The child-safety paradigm has deep roots in the automotive community, and its effects reverberate throughout the industry.

In the background art, means for the protection of a child from hazards presented by vehicles are provided by a variety of separate vehicle systems wherein each one of those separate systems is configured to deal with one specific hazard.

It would therefore be beneficiary to provide an integrative protection suite covering the various hazards to which children occupants of a vehicle are exposed during the complete cycle of operation of the vehicle. The disclosure of the present claimed invention reflects a shift in the child-safety paradigm as now recognizes and handles the set of potential hazards to which a child is exposed.

SUMMARY

It is an object of the present invention to provide a method for implementing a system offering an integrative protection suite, or protection envelope, in response to a complete cycle of operation of a vehicle, for protecting at least one child from potential danger associated with the vehicle, including prior to a ride, during the ride and after the ride in the vehicle. The vehicle has equipment elements including a plurality of sensors, a plurality of operable devices, and a plurality of alert systems useful for providing at least one warning signal. The system comprises at least one indicator operatively coupled to the equipment elements, and adapted to receive input commands, and a report module operatively coupled to the equipment elements and adapted to sample and reports a status condition of each one of the equipment elements. The system further comprises a control module operatively coupled to the at least one indicator, to the report module, and to the equipment elements, and adapted to control, manage, and operate the system. The control module is also configured to receive input commands from the at least one indicator, receive the status condition from the report module, execute control programs responsive to information received from the at least one indicator and from the report module, and to control activation and deactivation of the system.

It is a further object of the present invention to provide a method for implementing a system, the method providing an integrative protection suite, or protection envelope, in response to a complete cycle of operation of a vehicle to protect at least one passenger child being driven by a driver in the vehicle as a passenger, or at least one child outside and adjacent the vehicle. The vehicle has equipment elements and the method comprises the following steps:

associating the at least one child passenger with an identified passenger seat $VS_j$, providing automatic disablement of an interior door-opening-handle and of a power window-switch adjacent the identified passenger seat, in response to at least one of a signal commanding locking of all doors of the vehicle, and a dedicated signal command, providing control of either one of both airbag reduced speed/size and airbag shape of deployment and when appropriate, suppressing deployment of airbag(s) associated with the identified passenger seat, applying appropriate pre-tension of belt force to the identified passenger seat prior to detection of an unavoidable collision, communicating automatically with a crash notification system response center to report presence of the at least one child, activating an alert signal to remind the driver that the at least one child is left unattended in the vehicle when the vehicle resides in parked mode, including a child's presence message in a vehicle-to-vehicle communication protocol, activating a child-parking alert when appropriate, activating a doors-left-unlocked alert when appropriate, overriding signals attributed to incorrect use or to misuse of devices by a user, detecting driver errors including providing alerts, warnings, instructions and guidance advising correction of driver errors, detecting an ICSS or a child safety seat undesired disposition in the vehicle seat VSj and advising correction, detecting seat belt misuse, and advising correction, detecting incorrect use of an airbag cut-off switch including overriding of signals attributed to incorrect use, and advising correction, warning the driver against smoking in an interior of the vehicle, advising the driver to initiate a check to determine if the child is eligible for restraint in a booster seat, moderating operation(s) of climate control device(s), cooperating with driving assistance systems and driver condition warning systems, channeling services to at least one of the driver and the at least one child, controlling the vehicle's door locks to prevent a child from gaining access to the vehicle when parked, controlling disconnection of power to a cigarette lighter to prevent accidental setting on fire of the vehicle, notifying the driver of activation of an interior trunk-lid release apparatus, and recording of a predetermined set of child-related-data to enable accident inquiry.

The association of the at least one child passenger with an identified vehicle seat is achieved by at least one of the at least one child's presence being indicated by a user entering input commands into an indicator adapted to receive the input commands, and by automatic input command delivered by an occupant classification sensing and detection system.

Still another object of the present invention is to achieve the association of a child passenger with an identified vehicle seat VSj by coupling an ICSS to a vehicle interface, the method further comprising the steps of:

comparing of g data items received from the identification module of the ICSS with safety data to verify compatibility, comparing of f signals of the sensor module, and g data items of the identification module with safety data to verify compatibility, receiving of w signals regarding the g data items of ID data of the identification module to control airbags' deployment, where the g data items include at least one of seat type, seat dimensions and seat restraints, applying appropriate pre-tension belt force to a seat belt of the identified passenger seat occupied by the ICSS and where the ICSS is identified as a booster seat, upon detection of an unavoidable collision, communicating automatically data from an electronic unit of the ICSS with a crash notification system response center, checking for mutual compatibility between the child with respect to the specific ICSS into which the child is seated, the specific vehicle seat VSj, and the vehicle.

It is still another object of the present invention to allow association of data related to a child with vehicle owner attributes, the method further comprising the steps of:

advising the driver to initiate and execute a child-to-booster compatibility check, detecting if the ICSS identified by seat type is compatible with the age of the child, configuring operable devices of the equipment elements for total and partial disablement relative to the age of the child and the seat type identified by the ICSS, activating a child parking alert when appropriate, activating a doors-left-unlocked alert when appropriate, and applying available data to operate at least one device selected from the group consisting of a key-interlock, a brake-to-shift interlock, and a transmission interlock, to prevent accidental setting into motion of the vehicle.

BRIEF DESCRIPTION OF THE DRAWINGS

To understand the invention and to see how it may be carried out in practice, preferred embodiments will now be described, by way of non-limiting example only, with reference to the accompanying drawings, in which.

MODES FOR CARRYING OUT THE INVENTION

Figure 1:
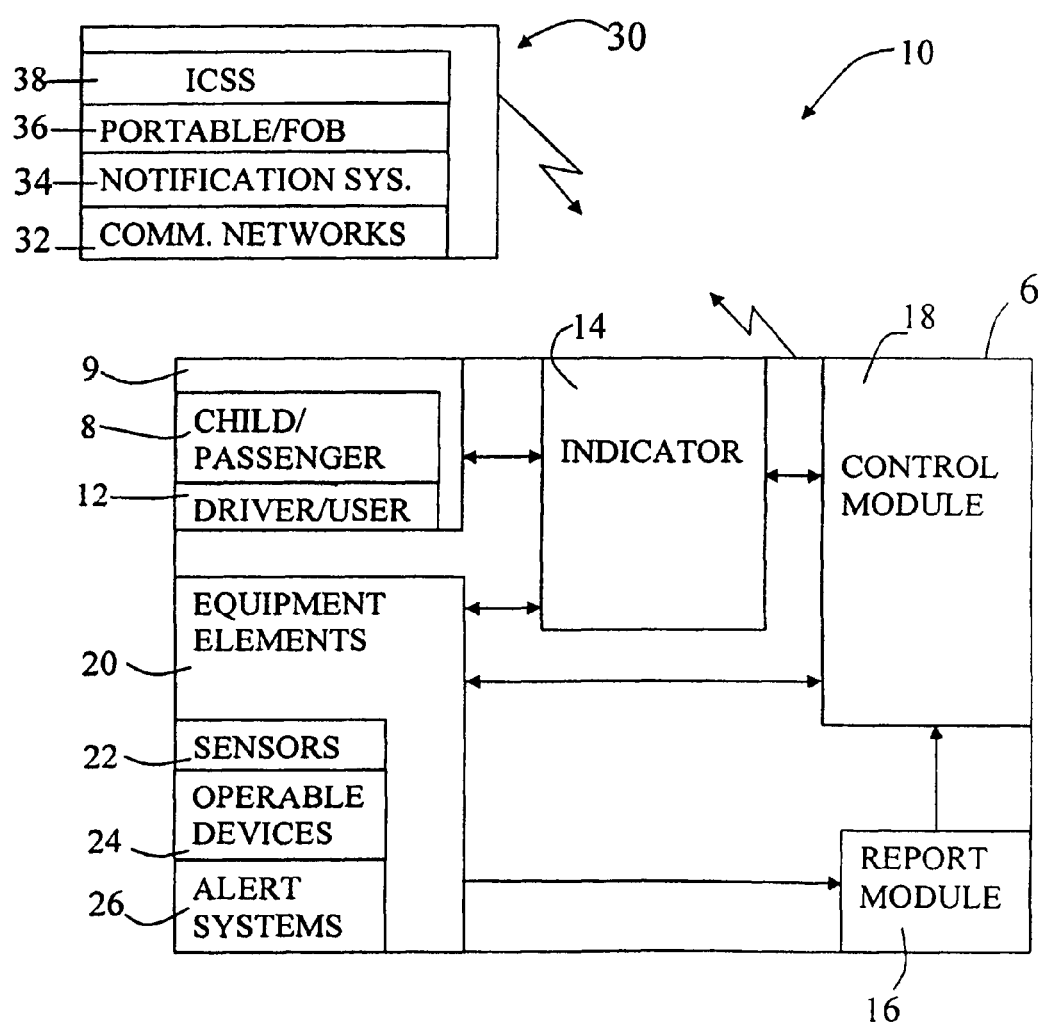
FIG. 1 shows a basic block diagram of a system for protecting a child from the hazards presented by a vehicle.

The embodiments described hereinbelow refer to methods, systems and devices for protecting at least one child passenger, and passengers in general, from dangers presented by a vehicle. Protection of children is provided for the complete cycle of operation of the vehicle, including prior to ride of the vehicle, driving the vehicle, driving and parking in the vicinity of children, and ending with parking the vehicle at the end of a drive.

The problem to be solved regards the mitigation of the potential dangers to which a child is exposed when strapped in a child-seat and traveling in a vehicle, and when the child is nearby the vehicle. For example, dangers to the child may be the result of a driver's error or improper driver behavior, and to deficiencies inherent to the operative vehicle systems relative to the child passenger, as well as dangers resulting from misuse of the child safety seat.

Dangers to the child resulting from driver's errors may include: frontover/backover accidents, incorrect setting of devices such as power child-lock, power window switches, power roof-panel, airbag cut-off switch, misuse of seat belt, overlooking safety instructions and placing an infant seat in a front passenger seat or in undesirable front passenger seat position, or vehicle doors—being left-unlocked when the vehicle is parked, or refraining from transferring the child to a booster seat when mandated.

Dangers to which the child may be exposed as a result of improper driver's behavior may include: the child being left unattended in a parked vehicle, the driver smoking when a child is inside the vehicle, inadequate driver's condition, and inadequate driver's driving performance.

Dangers to which the child may be exposed as a result of the operative systems of the vehicle include: optimization to protect adults but not children regarding airbag deployment, pre-crash selective belt pre-tension adjustment, and post-crash load limiters adjustment and lack of communication of child relevant data to event notification response center(s). Moreover, it is possible to operate automatic disconnection of power to the cigarette lighter when the driver's seat is unoccupied, activation of an event data recorder, moderation of the climate control, communication with nearby riding vehicles, warning related to and activation of the trunk entrapment apparatus, and activation of the gear shift interlock applications to prevent setting into motion of the vehicle.

Further dangers to which the child may be exposed include dangers resulting from misuse of the child safety seat, incompatibility between the child and the used child safety seat, as well as incompatibility between the child safety seat and the vehicle or vehicle seat. Moreover, incompatibility refers also to mismanagement of timely graduation of a child to an appropriate child safety seat, and may include detection of dangers such as the reuse of a child seat beyond the expiration date or after being involved in a crash, detection of child safety seat recall announcement, and lack of provision of real-time child safety seat installation instructions.

To solve this problem, there are disclosed a method and a safety system providing a protective envelope to at least one child and other passengers, and to children in particular, over the entire cycle of operation of the vehicle.

FIG. 1 shows for example a basic block diagram of a system 10 for protecting a child 8 in a vehicle 6 adapted to warn and remind a driver 12 that the child 8 has been left unattended in the parked vehicle 6. In the present description, the term "child 8" applies also to an infant, baby or a child, and to a passenger 8, both in singular and in plural, the term "driver 12" is meant as any user 12 operating the system 10, and the word "car" applies to vehicles 6 of different types. In the present example, the occupants 9 of the car 6 are the driver and at least one child-passenger. The occupant 9 may also refer to other adults and to adults classified as out of norm adults, as described hereinbelow. It is assumed that a child 8 is usually seated in a child safety seat, such as an infant seat, or a booster seat that is buckled to one of the vehicle seats of the vehicle 6. Certain vehicle seats also have seat belt buckles reporting whether these buckles reside in an unbuckled or in a buckled condition.

In the description hereinbelow, the term "child safety seat" applies to infant seats, to convertible seats (forward facing and rear facing), to forward facing child-seats, to combination seats, forward facing and rear facing, to booster seats and to vehicle integrated safety seats.

The term "Intelligent Child Safety Seat", or ICSS, applies to a child safety seat adapted to function as an indicator of the system 10, as described hereinbelow. The terms "ISOFIX" and "LATCH attachments" relates to a child safety seat including a LATCH system (Lower Anchors and Tether for CHildren). The term "ISOFIX" refers to the International Standard Organization (ISO) standard for a LATCH system wherein the lower attachment assemblies having lower rigid attachments, and the term "LATCH attachments" may refer to a LATCH system having lower flexible (straps) or rigid attachments on the child safety seat that connect to the rigid bars installed in the vehicle seat, and both are having the top tether hardware at the end of the LATCH attachment.

The term "out of norm adult" classifies adults and applies to pregnant women, to incapacitated adults, to small stature adults and to elderly persons. The terms "occupant classification sensing and detection systems" include the technology on which is based, for example, a passive or an active sensor within a preferred spectral band (infrared, visual, laser, RF, ultrasound), electromechanical (micro-switch, relay, strain-gauge, transducer) or electrical (capacitive) or a combination thereof.

In addition to the driver 12, the child 8, and equipment 20 inherent to a car 6, the system 10 shown in FIG. 1 is a simplified version selected for the ease of description, having three modules, namely an indicator 14, a report module 16, and a control module 18.

It is accepted that in general a vehicle 6 is fitted with various equipment elements 20, including a plurality of sensors 22, operable devices 24, and alert systems 26, further described hereinbelow. The equipment elements 20 include both equipment that is originally inherent to the vehicle as installed by the manufacturer of the car when delivered, and as equipment installed and added to the vehicle in retrofit. These equipment elements 20 may be controlled by a processor selected alone and in combination from the group consisting of a processor dedicated to the vehicle's equipment elements, and a processor dedicated to the control module 18.

The plurality of sensors 22 sending a status condition to the report module 16, may include as many as s different sensors where s=1, 2, 3, . . . , n1, where n1 is a finite integer. For example, sensors configured for the detection of events including seat belts buckling status, ignition switch status and ignition key presence, load on seats, engine RPM, gearbox shift position, parking brake status, windows and door-locks position, and smoke detecting sensor. These sensors s are continuously or intermittently sampled under command of the control module 18, and are configured to report the status of the equipment elements 20.

Operable devices 24 are those devices that the control module 18 is allowed to operatively enable, disable, or update according to signals provided by the indicator 14, while alert systems 26 are intended to provide warning signals to at least the driver 12, as well as to other people and functions. The operable devices 24 may include for example, as many as d different items, where d=1, 2, 3, . . . , n2, and n2 is a finite integer, including amongst others: engine ignition switch, ignition key switch retention mechanism, shift-interlock such as brake-to-shift or transmission shift, key-free system, gearbox functioning, seat restraints systems like the seat belt system and the airbag system, power windows and door lock modules, devices for releasing the trunk-lid from inside trunk compartment, central doors-locking devices, power accessories like electrically operated roof-panels, climate control devices, communication systems to establish communication with communication networks, the notification system, the automatic collision notification system, Internet communication systems, information systems like the driver message center, navigation systems, driving assisting systems like parking imaging and observation system, parking aid systems, lane departure and lane change systems, driver condition warning systems like for detecting driver intoxication and driver drowsiness, entertainment devices, information devices like belt reminder systems, occupant classification sensing devices, occupant detection devices, event data recording devices, audio systems, cigarette lighters, internal and external lights, the horn, the burglar alarm, the vehicle immobilizer system, the clock, and the timer.

The alert systems 26 are intended to provide warning to the driver, by way of emission of attention-calling signal(s). Visual or audible signals are intended for the interior and for the exterior of the vehicle 6. The alert systems 26, includes as many as m different systems, where m=1, 2, 3, . . . , n3, and n3 is a finite integer. For example, the alert system 26 may emit signals to the interior of the vehicle including dedicated vehicle warning lights such as for indicating the presence of a child, a smoking forbidding signal in the presence of a child, operation of the interior lights of the vehicle, audible alerts, such as chimes, buzzes, vocally recorded messages, screen readable messages, screen displayed images, warning labels and messages, operation of the audio system, and prevention of removal of the ignition key. Other alert signals such as tactile signals and vibration emitting signals are also practical.

Signals for the exterior of the vehicle may include the horn, the exterior lights, the vehicle's burglar alarm siren, and signals received by remote communication systems. It is noted that not all the operable devices 24 are also alert systems 26.

Other signals, even though not perceptible by sight or sound, include disabling of the vehicle's door locking mechanism and operation of some elements out of the communication unit 30, such as for emitting signal(s) to remote station(s).

The system 10 is also adapted to communicate with remote stations and users via communication networks 32, the notification system 34, a portable entry device, or key fob 36, and the ICSS 38. A communication unit 30 disposed in the vehicle 6, is operable by the system 10 and adapted for the reception and emission of communications.

In FIG. 1, one indicator 14 is shown coupled in bi-directional communication to the driver 12 and to the control module 18, and also coupled to the equipment elements 20. Likewise, the control module 18 is coupled in bi-directional communication to the equipment elements 20. Moreover, the report module 16 is coupled to the equipment elements 20 and to the control module 18. The report module 16 delivers inputs to the control module 18, which is configured to command one or more of the equipment elements 20.

The indicator 14 is configured to receive input instructions or commands, depending on the chosen type of indicator 14. The indicator 14 may include as many as i different types of indicators, where i=1, 2, 3, . . . , n4, and n4 is a finite integer. There is always at least one indicator 14*i*.

The functions of the modules pertaining to the system 10 will be described hereinbelow regarding the same example involving only a driver 12 and one child 8 riding as a single passenger in the vehicle 6, but reference is first made to FIG. 2 to provide an example of a different indicator 14 pertaining to an Intelligent Child Safety Seat, or ICSS.

Figure 2:
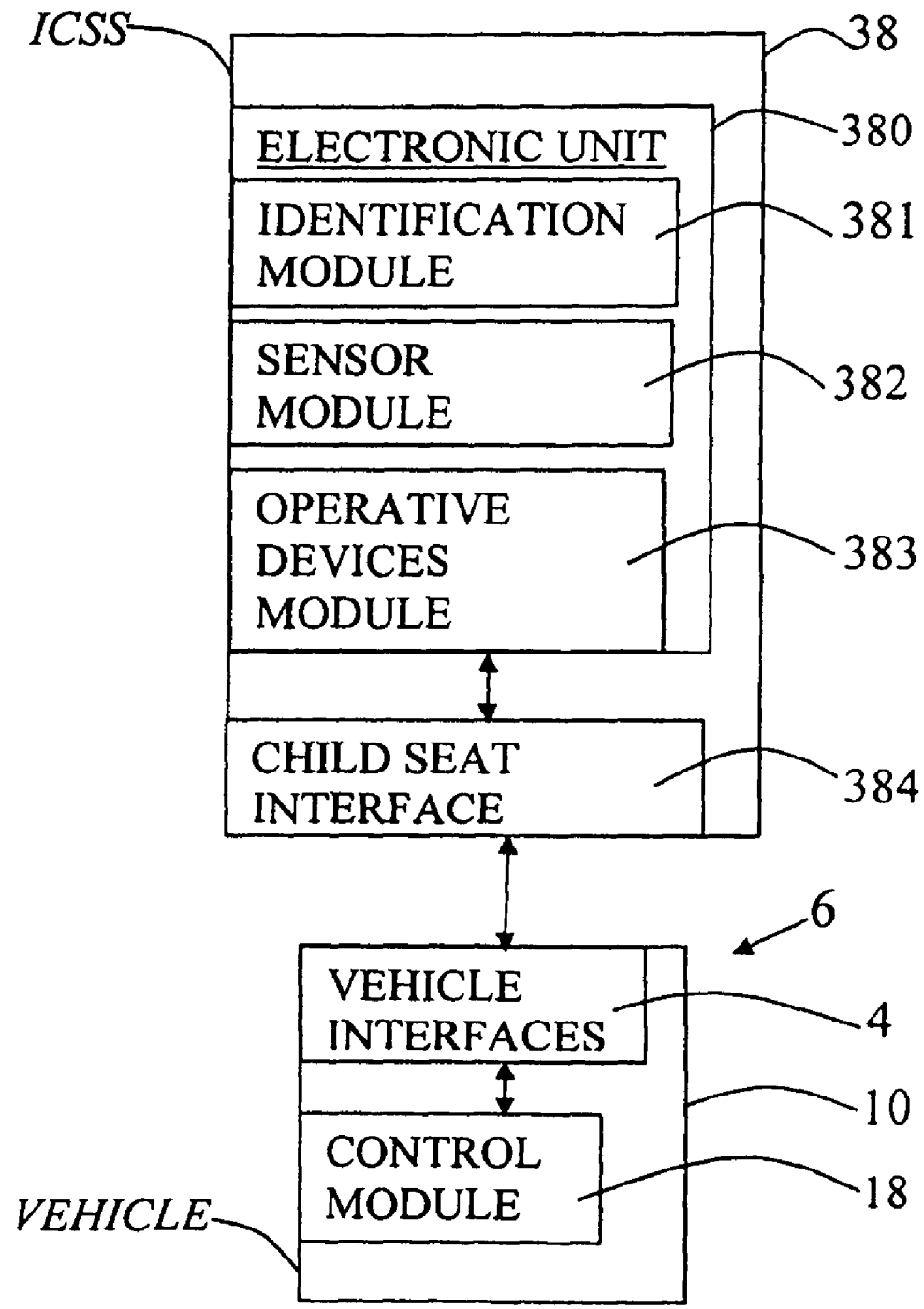
FIG. 2 is a schematic illustration of an intelligent child safety seat operative with the system depicted in FIG. 1.

FIG. 2 is a schematic illustration of an intelligent child safety seat 38, or ICSS 38, configured to also function as an indicator 14*i* of the system 10. The ICSS 38 is equipped with an electronic unit 380 and a child seat interface 384 for providing communication with a vehicle interface 4 disposed in the interior of the vehicle 6. The system 10 is thus operable with an interface, such as a vehicle interface 4 and a device interface, coupled to the control module 18 that is adapted to receive input commands entered by a user 12 into an indicator 14, integrated in a device interface such as a child safety seat interface 384, the interface disposition in the interior of the vehicle being selected from a group of dispositions consisting of a passenger seat, a passenger seat restraint, and also operable when in close proximity to the passenger seat.

An Intelligent Child Safety Seat 38 is described in detail in the International Application No. PCT/IL2007/001625 to the same applicant, which application is incorporated herein in whole by reference.

In FIG. 2, the ICSS 38 is operatively coupled to the vehicle 6, in communication with the system 10, and functions fully or partially as an indicator 14, which is adapted to communicate ICSS 38 specific data and child's 8 presence related data to the system 10.

In contrast with an ICSS 38, a regular child safety seat equipped with a child seat interface 384 allows its actual presence or state of occupancy to be recognized by the system 10, but an intelligent child safety seat 38, or ICSS 38, is adapted in addition to fully identify itself for recognition by the control module 18, and to communicate its identity and other information to and for use by the control module 18 and the equipment elements 20. Wired communication or wireless communication may be selected for the communication interface 384, which is referred to hereinbelow as a wired plug-in system for the ease of description only.

A plurality of vehicle interfaces 4, say one vehicle interface 4 per vehicle seat VS, helps to determine which one of the vehicle seats VSs of the vehicle 6 is coupled to an ICSS 38. Each vehicle seat VS, not shown in the Figs., may be associated with a specific vehicle seat identified as VSj, wherein j=1, 2, 3, . . . n5, and n5 is a finite integer.

Each vehicle interface 4 may be identified as 4*j*, wherein j=1, 2, 3, . . . n5, and be associated with a specific vehicle seat VSj. The control module 18 is thereby in position to identify exactly to which discrete vehicle seat VSj the ICSS 38 is coupled. In addition, the vehicle interfaces 4*j* may detect if the ICSS 38 is front facing or rear facing.

In a basic embodiment, the ICSS 38 is fitted with an electronic unit 380, which includes only a sensor module 382 having at least one sensor configured to detect the state of occupancy of the ICSS 38.

When the ICSS 38 functions as an indicator 14 of the system 10, the actions, or operations actively performed thereon or therewith are interpreted by the system 10 as input commands entered by the user 12. Such actions include coupling of the child seat interface 384 to the vehicle interface 4*j*, and buckling or unbuckling of the buckle pertaining to the ICSS 38. A feedback message returned to the user 12 acknowledges receipt of instructions by the system 10. It is noted that the system 10 recognizes the electronic unit 380 as an integral portion of the equipment elements 20.

Reference in now made to FIGS. 1 and 2. At the beginning of the drive or before starting a drive, the driver 12 enters an input instruction into an indicator 14, for example via the ICSS 38, to indicate whether or not a child is present as a passenger of the vehicle 6. In another example described hereinbelow, an occupant classification sensing, or detection system may enter automatic input commands into the indicator 14 to indicate the presence of a child 8. The description hereinbelow refers to a vehicle interface 4*j*, associated with a specific vehicle seat VSj, to which is coupled an ICSS 38 and into which a child 8 is restrained.

At the end of a drive, when the vehicle 6 is detected as residing at standstill in non-traffic parked mode and with the indicator 14 being previously loaded with a "child present" instruction, the control module 18 will trigger the activation of the alert system 26. Warning(s) are delivered to indicate that the child 8 is still seated in the vehicle 6. First, warning signals are emitted to the driver 12 in the interior of the vehicle 6, and when the driver 12 is detected as being absent from the driver's seat, then signals are emitted to the exterior of the vehicle 6.

A non-traffic parking mode may be optionally determined by sampling the hand- or leg-operated parking brake's engagement status, engine ignition status sensor, or engine RPM sensor returning a below driving-level signal. The engine ignition-off status refers to the status wherein the engine ignition and main electrical circuits are disabled, and the running engine status refers to the ignition switch being turned on and all electrical circuits being operational either before or after the starter is activated. In contrast with the background art, which monitors only engine ignition-off status, the various embodiments described hereinbelow also monitor a vehicle 6 when parked with a running engine.

If the driver 12 promptly retrieves the child 8 from the vehicle 6 as expected, then the control module 18 will receive a reset signal from the indicator 14, either as an input activated by a user 12, or via the ICSS 38, for example by unbuckling the ICSS buckle.

A signal emitted to attract the attention of the driver 12 when the vehicle 6 is parked, may include prevention of removal of the vehicle-key out of the ignition switch for a predetermined lapse of time. During that period of time any kind of "remove child" signal(s) may be emitted by the alert systems 26.

It is only by active user-delivered input command, such as handling of the ICSS 38 or by active input into the indicator 14, that the warning signals are turned off. This is achieved by operation of the control module 18 to reset the alert systems 26.

Else, if the driver 12 has forgotten the child 8 in the car 6, while ignoring internal alert signals of the alert system 26, and the driver is detected by the equipment 20 as being absent from the driver's seat, then the control module 18 will activate the external alert signals of the alert systems 26. The detection of the absence of the driver 12 from his seat is achieved by the sensors 22, which sample the driver's seat-load sensor(s) that generates a seat-unoccupied signal. Likewise, the driver's seat belt buckle sensor generates a belt-unbuckled signal. The control module 18 receiving a status report from the report module 16 registers that the driver 12 is absent from the vehicle 6, and in response, automatically activates the external alert signals.

The report module 16 thus delivers inputs to the control module 18, which is configured to command one or more elements of the alert systems 26 to deliver at least one alarm signal. According to the present example, the external alert alarm signals are given after a short lapse of time, while the driver 12 is still close to the car 6.

External signals include for example flashing the external lights, and turning on the burglar alarm, as well as disabling the central door locking system of the vehicle 6. A driver 12 is thus prevented from ignoring external alert signals, since when the driver 12 attempts to use the portable remote electronic car-entry device, or fob, to lock the vehicle while the external signals are operated, the central door locking system will not respond. This is an example of how the door locks, which are portion of the operable devices 24, partially function as an alert system.

Ultimately the system 10 is adapted to communicate with the communication unit 30, thus with an event notification system response center 34 or with a user 12 via a wireless communication network 32.

The external alert signals are deactivated in response to the control module 18 determining that the driver 12 has retrieved the child 8 from the car 6, as described hereinabove.

Should the driver 12 wish to leave the vehicle 6 while the child 8 is seated therein but under adult 13 supervision, as allowed by law, the driver 12, or another user, has to enter an input instruction into the indicator 14 indicating that the child is supervised. The adult 13 is not shown in the Figs. An input command indicating that a "child is under adult 13 supervision" is entered by the user 12 into an indicator 14, which is an I/O, Input/Output, device of any known type. The control module 18 will respond accordingly and suspend alert signals.

The sensors 22 may include as many as s types of sensors and the list of sensors referred to hereinabove should be regarded as an example only. When a vehicle 6 is operative with a key-free system, then certain modifications have to be made to adapt the system 10.

The operation of the system 10 is based on a driver 12 or user 12 actively entering an input command or instruction into an indicator 14, to at least reflect a passenger presence status, for example indicating that a child 8 is seated in the vehicle 6. However, the operation of the system 10 may be based on other different defaults instructions or conditions, or on various indications from sensors 22 pertaining to the equipment elements 20, and the description provided hereinabove should be regarded as an example only.

To allow an accident event inquiry in case of accident, data related to the system 10 are recorded by and retrieved from an event data recording device or EDR pertaining to the operable device 24, but not shown in FIG. 1. It is noted that the system 10 always remains operative, thus also operative in the background even when deactivated by instruction entered via the indicator 14.

In FIG. 1 the control module 18 is shown as being coupled in bi-directional communication to the operable devices 24. The control module 18 may send one or more signals and data to actuate any one of the operable devices 24, and these signals include as many as w different type of signals, where w=1, 2, 3, . . . , n6, and n6 is a finite integer. The signals sent to the operable devices 24 may include any of the signals listed hereinbelow. According to the description related to FIG. 1, the indicator 14 is shown to be also coupled in bi-directional communication with the equipment elements 20, therefore each element out of the equipment elements 20 may be configured to operate in association with the input commands received by the at least one indicator 14, and that each one the operable devices 24 is configured to operatively respond in association with at least selected input commands received by the at least one indicator 14.

A command signal to "disable operation" is sent to control the operation of power-operated devices installed near a vehicle seat VSj not shown in the Figs., wherein a child 8 is disposed. For example, a "disable operation" signal is sent to an electromechanical or power-child-lock to automatically disable the internal door-handle from operation. In the same manner, a "disable operation" signal may be sent to the power-window module to automatically disable the power-window switch.

Moreover, a "disable operation" signal may be sent to the central door locking system to supplement the conventional securing of all the locks of the vehicle 6 for the simultaneous disablement of the power-window switches and the internal door-handles from operation. The triggering of a child-central-door-locking application is not restricted to a single method, but may be initiated by automatic command or by a manual command received from the driver 12. For example, a manual input command is a direct command given by the driver 12 operating a designated switch, and an automatic command may be regarded as the automatic detection that the vehicle 6 is being driven. Automatic detection includes, for example, the detection of an engine RPM indicating a driving-level RPM, or a gear lever/stick residing in "D", which is the drive position for an automatic gear transmission. When a child 8 is aboard, the user 12 is reminded by the control module 18 to check the settings of mechanically operated devices, such as for example, of a mechanical child-lock pertaining to the operable devices 24.

A command indicating a "disable operation" signal may also be sent to devices selected out of the operable devices 24 when the vehicle 6 is detected as being parked with a child 8 seated therein and the driver 12 being absent. For example, a "disable operation" signal may be sent to disable the cigarette lighter from operation, mainly to prevent accidental setting on fire of the vehicle 6. That last command may for example disconnect the power supply from the cigarette lighter. An input command to permanently disable the power supply of the cigarette lighter is also available. In the same manner, a "disable operation" signal may be sent to automatically disable the operation of the roof-panel(s) switch.

A signal indicating that a "Child occupies vehicle seat VSj" may be sent to the restraint systems of the vehicle seats VSj.

The restraint systems will respond and adjust, or regulate, their operation in response to data received from the indicator 14.

It is noted that the restraint systems are operable to respond to input commands regarding any passengers 9, and related applications may include for example:

1. Control of the deployment or total suppression, as well as control of the deployment speed, shape and size of airbags in case they might present a danger to a child 8.

2. Control of belt pretension, to exert selective force upon the vehicle seat's VSj seat belt when a collision prediction device predicts an unavoidable imminent collision when appropriate;

3. Detection of an incorrect setting of the frontal airbag cut-off switch, to automatically override the incorrect setting and provide an alert signal to the driver 12 that a correction was made, or else, that the driver 12 himself should make the correction. An incorrect setting of the frontal airbag cut-off switch is determined when a mismatch is detected between the airbag cut-off switch setting and the class to which pertains the passenger 9 seated in the front passenger seat.

4. Communication of a child's 8 presence and disposition in the interior of the vehicle 6 to an event notification system response center 34, automatically transmitted in case of a crash, in addition to the conventional set of data.

It should be noted that the passenger restraint systems and related applications address all types of airbags, including belt-airbags, side impact air bags, rollover curtains, and other vehicle airbags. Operation also applies to input commands entered into the indicator 14 to point to the presence of out of norm adults, according to the description hereinbelow.

The data signal indicating that a "Child occupies vehicle seat VSj" may also be sent to devices selected out of the operable devices 24, whose operations needs to be regulated and adjusted to meet child-protection objectives. For example, the data signal may be sent to an electronic control unit, or ECU, not shown in the Figs., to selectively regulate a desirable environment air temperature when a child 8 is aboard the vehicle 6.

A data signal indicating that a "Child occupant is present in the vehicle 6" may also be sent to devices selected out of the operable devices 24, in response to data received from the indicator 14 and may include the following actuations:

1. Triggering of the event data recorder device, or EDR, not shown in the Figs., to start recording a predetermined set of child related data, which may include data originating from the ICSS 38. Such recorded data enables the reconstruction of a situation prior to an accident and facilitates an accident inquiry;

2. Triggering of a vehicle-to-vehicle, or V-V communication interface to communicate that "child(ren) is/are present in the vehicle 6" to raise the awareness of other drivers riding cars adjacent the vehicle 6;

3. Triggering a notification device to communicate the presence of a child 8 in the vehicle 6 to remote station(s). In response, travel, safety, advisory, emergency and entertainment related data are directed and sent to the vehicle 6.

The data signal indicating that a "Child occupant is present in the vehicle 6" may also be sent to the alert systems 26 to protect a child 8 from secondhand smoke illnesses, by delivering a warning to the driver 12 that smoking is prohibited inside the vehicle 6. The alert systems 26 may initiate the activation of a "smoking forbidden" warning light, which remains lit during the entire ride of the vehicle 6, or only for a predetermined lapse of time. The activation of the alert systems 26 may be subject to the detection of smoke by a smoke-detection sensor, which is one out of the plurality of sensors 22, with respect for example to a child 8, who is 6 years old and younger. Methods for determining the age of a child 8 are descried hereinbelow.

Signals may also be sent from the operable devices 24 and from the communication unit 30 to the control module 18, which in turn commands the activation of the alert systems 26 and/or commands the communication of a dedicated signal to other operable devices 24. The signals for the detection of triggering events may include none or as many as t different types of signals, where t=0, 1, 2, 3, . . . , n7, where n7 is a finite integer. As an example only, such "triggering event detected" signals may be sent from the following devices:

(i) the driver's condition warning application(s), such as those configured to detect a driver's 12 condition related to lack of alertness or intoxication;

(ii) under predetermined conditions, the driving assisting application, such as lane departure, lane change, which application is configured to detect inappropriate driving;

(iii) the interior trunk release apparatus, to indicate the detection of a child's 8 presence inside the trunk compartment of the vehicle 6.

The electronic unit 380 included in the ICSS 38 has a sensor module 382 which may include none or as many as f different sensors 382$f$, where f=0, 1, 2, 3, . . . , n8, with n8 being a finite integer. There may thus be no sensor 382$f$ when f=0, or one sensor 382 when f=1. Each sensor 382$f$ may be dedicated to a specific purpose.

The report module 16 also samples the status condition of sensors pertaining to the sensor module 382. As an example only, some sensors 382$f$ integrated within the ICSS 38 may include: a safety seat buckle sensor, a weight/load sensor(s), inclination sensor(s), various child seat contact sensor(s), harness tension sensor(s), seat attachment sensor(s), seat orientation sensor(s), and more.

The control module 18 supports a processor configured to operate in conjunction with a computer memory that stores instructions related to desirable thresholds of sensor(s) 382$f$. Therefore, a status condition received from a 382$f$-type of sensor(s) is utilized to activate the alert system 26, or to command the operable devices 24, or to command the electronic unit 380, so as to compel the driver 12 to engage into corrective actions.

FIG. 2 also depicts that the electronic unit 380 of the ICSS 38 includes an identification module 381.

The identification data, or ID data, provided by the identification module 381 of the ICSS 38 may include none or as many as g different data items, where g=0, 1, 2, 3, . . . , n9, and where n9 is a finite integer. As an example only, a few ICSS 38 data items that may be included in the ID data are: Seat type, seat orientation, seat installation instructions, seat limitations, seat dimensions, seat manufacturer, seat model data and features, and seat restraints.

The control module 18 may thus take advantage of the received ID data to mitigate potential dangers to the child 8 disposed in the ICSS 38 by taking appropriate action(s) to alert the driver 12, for example including commands for the operation of operable devices 24. Based on the received ID data, the system 10 may automatically perform various checks to detect possible incompatibility between the ICSS 38 and the vehicle 6, the child 8 and the ICSS 38, and promote implementations of new applications, described hereinbelow.

The checking operations performed to detect possible incompatibility between the ICSS 38 and the vehicle 6 may include none or as many as b different checks, where b=0, 1, 2, 3, . . . , n10, and n10 is a finite integer. The control module 18 may thus compare any g data item received from the identification module 381 with the safety data stored in the control module 18 to verify compatibility. For example, the control module 18 may conduct b types of checks and deal with warning(s) to be delivered to the driver 12 when:

(a) Incompatibility is detected between the ID data of the identification module 381 that identifies the ICSS 38 seat manufacturer and the safety data stored in the control module 18, which includes a list of automaker's and/or of regulatory agencies' approved child safety seat manufacturers;

(b) Incompatibility is detected between the ID data of the identification module 381 which identifies the ICSS 38 seat model and the safety data stored in the control module 18, which includes the list of child safety seat models compatible with the specific model of the vehicle 6;

(c) Incompatibility between the ID data of the identification module 381 that identifies the ICSS 38 seat model where the ICSS 38 is detected as being restrained in a vehicle seat VSj, but the safety data stored in the control module 18, which includes a list of recommended vehicle seats VSs, does not recommend coupling the ICSS 38 to that specific vehicle seat VSj;

(d) Incompatibility is detected between the ID data of the identification module 381 that identifies the ICSS 38 seat restraints and the safety data stored in the control module 18, which includes a list of vehicle seats VSs providing anchorage for the ICSS 38 that is not compatible with the integrated restraints of the ICSS 38 installed in the vehicle seat VSj;

(e) Incompatibility is detected between the ID data of the identification module 381 that identifies the ICSS 38 seat restraints, such as ISOFIX or LATCH attachments, where the seat belt of the vehicle seat VSj is used;

(f) Incompatibility is detected between the ID data of the identification module 381 that identifies the ICSS 38 seat model data, which disclose the seat expiration date, and the actual calendar date as may be recorded on board of the vehicle 6. The control module 18 commands the activation of a warning signal stipulating "ICSS expiration date passed". This check aims to warn and prevent the use of an ICSS 38 beyond the expiration date recommended by the manufacturer of the ICSS 30;

(g) Compatibility is detected between the ID data of the identification module 381 that identifies seat manufacturer and seat model data like seat number, model number, date of manufacture, and an input command disclosing the properties of an ICSS product recall announcement. The control module 18 commands the activation of a warning signal stipulating "ICSS product recall match" when a match is detected between the ID data of the ICSS 38 and the properties of the product recall announcement. The properties of the ICSS product recall announcement may be entered as either one of both, or as both, automatic command received from a remote station and as a manually input command entered by the driver 12;

(h) Compatibility is detected between the ID data of the identification module 381, which identifies that a crash flag was registered in the memory pertaining to the identification module 381. The control module 18 commands the activation of a warning signal stipulating "ICSS crash involvement" as an alert signal when a crash flag is detected, to warn and prevent the use of the ICSS 38 after a crash, against the safety recommendation of the manufacturer of the ICSS.

The control module 18 may take advantage of the received ID data regarding the seat installation instructions stored in a memory pertaining to the ICSS 38 and/or in the control module, for providing the user 12 with seat installation instructions. Real time installation instructions may be presented to a user 12 as instructions selected alone and in combination, from the group consisting of visually presented and vocally sounded installation instructions.

The checking operation(s) operated to detect incompatibility between the ICSS 38 and the child 8 may include none or as many as h different checks, where h=0, 1, 2, 3, ..., n11, and n11 is a finite integer. As an example only, the control module 18 may compare sampled status condition of any one of the f sensors of the sensor module 382 and any one of the g different data items of the identification module 381 with safety data stored in the control module 18, to verify compatibility. For example only, the control module 18 may conduct h types of checks and deal with warning(s) delivered to the driver 12 when:

(a) Incompatibility is detected between the ID data of the identification module 381 that identifies the ICSS 38 seat limitations and the recommended specifications of the ICSS 38 regarding the weight range and the weight of the child 8 as measured by a weight sensor 382*f*. For example, when it is detected that the weight of the child 8 is out of the recommended weight range;

(b) Incompatibility is detected between the ID data of the identification module 381 that identifies the seat type, and the seat type is incompatible with the age of the child 8. For example, the control module 18 may perform checks to detect if the seat type, designed by its manufacturer to be occupied by a child within a specified age range, is incompatible with the age of the child 8 and if so, then to warn the user 12 about the need to graduate the child 8 to an appropriate ICSS 38 or to a vehicle seat VS. The control module 18 may emit the following warnings:

(bi) an alert signal stipulating "Graduate the child to a front facing child seat" when a mismatch is detected between an ICSS 38, which seat type is identified as a rear facing infant seat, and is found to be incompatible with the age of the child 8;

(bii) an alert signal stipulating "Graduate the child to a booster seat" when a mismatch is detected between an ICSS 38, which seat type is identified as a front facing child seat, and is found to be incompatible with the age of the child 8;

(biii) an alert signal stipulating "Graduate the child to a vehicle seat" when a mismatch is detected between an ICSS 38, which seat type is identified as a booster seat and is found to be incompatible with the age of the child 8. The description of a child-to-booster compatibility check is described hereinbelow The system 10 is configured to implement additional applications based on ID data received by the control module 18 from the identification module 381.

Signal(s) w specifically correspond to the g data items of ID data received from the identification module 381, including but not limited to the following:

A command signal indicating a "selective operation" that is sent to control the operations of the power operable devices 24 installed adjacent the vehicle seat VSj. The control module 18 stores safety data regarding the enablement and disablement of operation of operable devices 24*d* based on the age of the child 8. The "selective operation" signal is sent to regulate the operation of specific operable devices 24*d* when it is desired to operate them in total or partial disablement mode. For example, when it is desired to completely disable, or to enable limited window opening as controlled by the power-window switch adjacent the vehicle seat VSj.

The data signal indicating the "ICSS 38 seat type disposed in the vehicle seat VSj" is sent to the occupant restraint systems pertaining to the operable devices 24 for regulating their operation in response to the delivered seat type data. For example, control of the airbags' deployment may be based on the data received from the electronic unit 380 of the ICSS 38. Furthermore, the belt pretension force exerted upon the seat belt of vehicle seat VSj is controllable, which is especially important when the ICSS 38 is a booster seat. Moreover, a dedicated instruction is delivered to the user 12 to dispose the ICSS 38 in a vehicle rear seat when the ICSS 38 is identified as a rear-facing infant seat installed in the vehicle's front passenger seat. In addition, a dedicated instruction is delivered to the user 12 to move the front passenger seat VSj backwards when the report module 16 delivers readings from the position sensors of the front vehicle seat indicating an undesirable seat position relative to the class of the passenger(s) 9.

In the same manner, after a vehicle's 6 crash, an automatic collision message that may also communicate the ICSS 38 seat type and other data provided by the electronic unit 380, is communicated to the event notification system response center 34.

A data signal indicating the "Seat dimensions of the ICSS 38 disposed in the vehicle seat VSj" is sent to the occupant restraint systems to regulate its operation. A sensing and diagnostic module (SDM), not shown in the Figs., calculates safety thresholds for the deployment of the airbags based on the dimensions of the identified ICSS 38 relative to other parameters. For example, parameters including the vehicle seat VSj, the physical dimensions of the passenger compartment of the vehicle 6, the status condition of the vehicle's front seats position sensor(s), and the status condition of the vehicle's front seats backrest recline sensors.

The data signals indicating the "ICSS 38 seat type disposed in vehicle seat VSj" may be sent to the occupant restraint systems to command the suppression of the front seat passenger airbags when the ICSS 38 disposed in the front passenger seat is identified as having ISOFIX and LATCH seat attachments. Moreover, the detection of user 12 error actions may address the misuse of a seat belt pertaining to a particular vehicle seat VSj that is reported as being occupied by an ICSS 38, which is identified as being equipped with ISOFIX or LATCH attachments.

The operative devices module 383 of the electronic unit 380 shown in FIG. 2 also depicts that the ICSS 38 may include none or as many as z different operative devices 383z, where z=0, 1, 2, 3, . . . , n12, and n12 is a finite integer. There is thus not necessarily even one operative device 383z, but such optional operative devices may be included in the ICSS 38 if desired.

An operative device 383z may possibly emit an alarm signal, or entertain the child, or keep him busy during travel in the vehicle 6. Other types of operative devices' 383z may include harness pretension devices, restraint inflation devices, and even devices for the inflation of protective airbags.

The control module 18 may send message signal(s) to the operative devices module 383, including none or as many as u different type of signals, where u=0, 1, 2, 3, . . . , n13, and n13 is a finite integer. As an example only, such message signals sent to the operative devices' module 383 may include the following signals:

(i) A "child 8 identity" data signal that is sent from the vehicle's 6 computer to an operative device 383z, which is a memory device designed to store various types of data.

(ii) An "entertainment programs" signal that is channeled to the operative devices 383z, for providing entertainment programs received from remote station(s).

(iii) An "activate device" signal that is sent from the control module 18 to an operative device 383z, which includes actuated or deployable device(s). For example, such devices may include an alarm system, and an ICSS 38 seat harness pretension device.

In contrast with a background art child safety seat, the electronic unit 380 of the ICSS 38, and in particular the identification module 381 which is loaded with ID data, facilitates the implementation of the plurality of child protection embodiments described hereinabove.

Reference is made to FIG. 1 to describe further applications of the system 10, which are based on other types of indicator 14. The indicator 14 may be configured to report vehicle owner attributes, such as the identity data of the children usually driven in the vehicle 6, and the location of the high-risk parking zone in relation to the identified children. The vehicle owner attributes are entered as input into the indicator 14 once and contrary to other input instructions, are not reset with each new engine-ignition cycle. Evidently, if desired, the vehicle owner attributes may be reset and modified when desired.

For example, when the driver message center included in the operable devices 24 is also put to use as an indicator 14, in addition to other functions, a new set up menu may be accessed, for the user 12 to enter the following data:

Location of high-risk parking zones, which are selected and entered as input in conjunction with the vehicle's 6 positioning device, or any navigation system able to determine the location of the vehicle 6 in real time;

Identity data regarding the child(ren) 8 that may include the number and age of the children usually being driven in the vehicle 6. The system 10 may monitor, for example, only children in the age group between 0 and 12 years of age. For example, vehicle owner attributes including vehicle owner's personal and family information as well as other relevant data such as names, age, contact information, certain medical condition information, which may also be automatically delivered for storage in a vehicle 6 memory, as received from a notification system 34 to which the vehicle owner 12 is a subscriber.

A child-parking alert embodiment, not shown in the Figs., is a first application that is based on data entered as attributes and is designed to enhance the alertness of the driver 12 to the possible presence of a child 8 in an area defined as a high-risk parking zone, when parking and when maneuvering the vehicle 6. This feature is intended for implementation especially in areas regarded as being high-risk parking zones, such as when parking at home, in a driveway, or near a school, to prevent possible accidents where children may be running around.

The triggering of a child-parking alert may be based on at least one of the following:

(i) Sensing of real time position and motion of the vehicle 6 within a high-risk parking zone;

(ii) Detecting an area prone to the potential presence of a child 8 adjacent the vehicle 6 when the child 8 is not a passenger onboard the vehicle 6;

(iii) Detecting if the number of children occupying a vehicle seat(s) VSj is less than the number of children registered by the driver 12 according to vehicle owner attributes and usually being driven in the vehicle 6, then a child 8 is regarded as being potentially present outside and/or adjacent the vehicle 6. The child parking alert includes at least one of the following:

(a) Command of the activation of visual and/or audible signals by the alert systems 26 under command of the control module 18. Interior alert signals are intended to warn the driver 12 while exterior warning signals are primarily intended to warn one or more of the children 8;

(b) A message indicating that a "safety system activation" is sent by the control module 18 to operable devices 24 to command activation of driving assisting device(s), such as camera-based apparatus, which may employ at least one imaging camera and at least one display to provide the driver 12 with a view for the observation of otherwise hidden zones.

For operation of the child-parking embodiment, the indicator 14 may be updated by help of a remote notification system 34 or by using a navigation system map indicating the location of high-risk parking zones, pointing to potentially dangerous parking lots, school areas, home driveways, and the like, or as selected and indicated by the user 12.

A doors locking embodiment, not shown in the Figs., is a second application that is based on vehicle owner attributes for prevention of child-related accidents due to the doors of the vehicle 6 being left unlocked, especially in a home driveway or in a parking lot, which in accordance to research findings are highly dangerous areas. Various types of child-related accidents include entrapment of a child 8 in the interior of the vehicle 6, setting into motion of the vehicle 6, trunk-entrapment, fire caused by a cigarette lighter and the like, all to be prevented by denying access to the vehicle 6, to children 8 and others.

The doors locking embodiment is triggered by at least one of the following:

(i) The report module 16 reporting that the vehicle 6 resides in a standstill parked mode, either with the ignition off or with a running-engine;

(ii) The report module 16 reporting that the doors of the vehicle 6 are not locked, and that the driver's seat is unoccupied;

(iii) The report module 16 reports that the last recorded GPS location position before parking matches with an area recorded as being a high-risk parking zone.

Therefore, after a predetermined lapse of time, when the vehicle 6 is detected as residing in parked mode within a high-risk parking zone, and when a child 8 is not indicated as being supervised by an adult 13, then the control module 18 will command at least one of the following steps:

(I) Activation of the external alert signals of the alert systems 26 as a warning(s) to the driver 12 that the doors of the vehicle 6 are not locked;

(II) A message signal indicating to "lock doors" is sent to the doors' locking module of the operable modules 24.

The doors locking alert includes monitoring of the doors' locking mode of the vehicle 6 also when the vehicle 6 is parked with a running-engine, and when residing in a high-risk parking zone.

Should the driver 12 wish for any given reason not to lock the doors of the vehicle 6, then a dedicated instruction has to be entered into the indicator 14 stipulating supervision of the vehicle 6, or supervision of a child 8 if present. Such an instruction reflects a situation wherein an adult 13 is present, thereby suspending the alert signals of the alert systems 26.

It is understood that in this last example, regarding only the doors-unlocked-alert, the report module 16 may check on other sensors 22 of the equipment 20, such as the door-open sensor, the key-in-switch sensor, and that the alert system 26 may include an automatic central door locking procedure when the vehicle 6 is determined as being "empty" from passengers. In contrast with the background art monitoring only vehicle locking in the engine ignition-off status, the doors locking embodiment described hereinabove include for example, detection of vehicle locking when the vehicle is parked with a running engine and in particular when vehicle real time position and motion is sensed within a high-risk parking zone.

A child-to-booster compatibility check, not shown in the Figs., is a third application that is based on vehicle owner attributes. This user-friendly application is designed to remind the driver 12 to check if the child 8 has reached a certain minimum height and is eligible for transfer to a booster seat. It is understood that the same check is configured to detect if the height of the child 8 exceeds the maximum height and that the child is eligible for transfer to a vehicle seat VS. The control module 18 issues a message to the driver 12 advising him/her to conduct a child-to-booster compatibility check, which consists of measuring the child's 8 height.

The child-to-booster seat compatibility check is based on at least one of the following:

(i) The stored vehicle-owner attributes provide the age or age range of the child 8, which is intermittently monitored from time to time. Alternatively, the age of the child 8 may be provided by the ICSS 38 or by identification of the ICSS 38 seat type;

(ii) The age of the child 8 as stored in the system 10 resides within the predetermined age ranges. For example, the system 10 may monitor the age of the child 8, and checks conducted from, say, the age of 36 month and on, with intervals of say, 3 months between successive checks;

The child-to-booster compatibility check may include at least one of the following:

(i) The control module 18 commanding the activation of visual or of audible signals provided by the alert systems 26 and intended for the interior of the vehicle 6, to advise the user 12 to check if the child 8 reached or passed the booster seat required minimum/maximum height, respectively;

(ii) The control module 18 commanding the activation of visual or of audible signals provided by the alert systems 26 to advise the user 12 to conduct a vehicle 6 related child-to-booster check. An activation signal indicating "child-to-booster check-on" is entered by the user 12, causing a signal to be sent to the power window module commanding the window(s) of the vehicle 6, to deploy the window to the minimum height from the ground from which a child 8 should be is restrained in a booster seat followed by the maximum height after which a child 8 should be seated in a vehicle seat VS and use a seat belt. During the child-to-booster check the child 8 is required to stand outside and adjacent the door(s) of the vehicle 6. The user 12 is then in a position to visually determine if the child 8 has reached the minimum height or has matured to the use of a seat belt.

The child-to-booster check is intended to complement educational efforts and campaigns, such as the Booster America campaign designed to raise the awareness of drivers 12 to the need for a child 8 to be driven in a vehicle 6 in a booster seat when he/she reaches the minimum height.

When the window controls of the operable devices 24 perform a child-booster check, then the driver 12 may adjust the windows' height to match the height of the child 8 while the measured height will appear on a display, such as that of the driver message-center display. The physical dimensions of the vehicle 6 may restrict the child-to-booster check. Moreover, warning labels stating, for example, "booster minimum height" and "booster maximum height" may be attached to any portion of a vehicle's body, or vehicle's windows, at respectively, the minimum height and at the maximum height from the ground.

Another application of the system 10 that is based on the vehicle owner attributes allows the control module 18 to command the delivery of dedicated message signal(s) w, such as a "children are usually driven in this vehicle" signal and a "high-risk parking zone" signal, to any one of the appropriate operable devices 24. For example, to prevent the vehicle 6 from being accidentally set into motion by a child 8, conditions for various interlock application may be based on vehicle owner attributes. The interlock devices may include a brake-to-shift interlock, a brake transmission interlock, and a key interlock application.

Moreover, when the system uses the vehicle owner attributes, the control module 18 may command the alert systems 26 to deliver personal messages, corresponding to family related information, such as happy birthday messages.

Description of the Indicator

The system 10 may be operative with at least one autonomous indicator 14. The description hereinabove includes an ICSS 38 adapted to serve as indicator 14. However, the implementation of the system 10 is not limited to a specific type of indicator 14. In fact, the indicator 14 is an I/O, Input/Output, device of any known type, having some, all, or a combination of the capabilities including a keyboard with or without a display, one or more switches, a touch-screen, a vocally commanded device responding in natural language or by audio or tactile signals. A selected indicator 14 may include all the available functions or be configured to receive only a portion of the available input commands and default instructions. The indicator 14 may be configured for operation as a central indicator 14 or as a distributed indicator 14.

There is thus at least one indicator 14 that is selected alone and in combination from the group consisting of indicators permanently coupled to the vehicle, indicators removable from the vehicle, and portable removable and remotely operating indicators. Furthermore, the at least one indicator 14 may be configured to receive input commands selected alone and in combination from the group consisting of manual input commands, automatic input commands, vocal input commands, memory-stored input commands, memory-stored data and remotely communicated input commands. The at least one indicator 14 may be coupled in single or bi-directional interactive communication with the control module 18, possibly by wire, or by wireless communication, or by both wire and wireless communication.

The operation and configuration of the indicator 14 is limited only by the state of the art. In other words, the indicator 14 may be operable by preprogrammed menus, in dialogue mode, by interactive commands, and by any other known means. The operable devices 24, and in particular the occupant restraint systems, may be adapted to adjust their operations relative to indicator 14 provided data. For example, by use of data provided by the indicator 14, it is possible to differentiate between a child user of the seat belt and an adult user. The input commands entered into the at least one indicator 14 may provide to the control module 18 first signals indicative of the presence of a child 8 in a passenger seat VSj, a buckled passenger seat belt may provide to the control module 18 second signals indicative of the presence of a passenger, and the control module 18 may accept the absence of first signals and the presence of second signals as a default signal indicative of an adult passenger being buckled in the passengers seat. Thus, by default, a vehicle seat VSj is registered as being occupied by a within-norm adult 13.

In addition, if desired, an indicator 14 may be integrated within any one of the equipment elements 20, such as for example, a seat belt, or within equipment removable from the vehicle 6, such as an intelligent child safety seat 38. Evidently, an indicator 14 is possibly implemented as a portable remote control device, a personal electronic device, and even integrated within a portable electronic entry device or a key fob 36. It is thus possible for the at least one indicator 14 to be integrated into devices selected alone and in combination from the group consisting of electrically portable entry device, driver message center, navigation system, notification system, seat belt restraints, parking imaging and observation system, wireless communication module, child safety seat, and intelligent child safety seat ICCS 38, and for the at least one indicator 14 to be integrated into devices including devices originally inherent to the vehicle and devices added to the vehicle in retrofit.

An indicator 14 adapted to receive manual input commands and vocal input commands is operable by the driver 12, or by a user 12 who is another person, none of the operators being shown in the Figs. That type of indicator 14, which is the interface between the driver 12 and the system 10, may be configured to include a wide range of default instructions. These default instructions may be either programmed a priori, or dependent on the type of indicator 14.

Therefore, a single-entry input of instruction into the indicator 14 may reflect the identification of both a child's presence and his disposition relative to a seat VS of the vehicle 6. In addition, the orientation of a child safety seat, especially in a front passenger seat of the vehicle 6, may also be identified as a default instruction.

Furthermore, a single entry input command may include at least one action taken on at least one occasion. For example, one action of a user 12 may include coupling the ICSS 38 to the system 10, which instruction remains valid for at least one engine-ignition cycle, as well as a second complementary user action including the latching of the buckle of the ICSS 38.

The driver 12 may be provided with a view of the vehicle seat-occupancy settings as an automatically displayed message, and receive various warning messages. Thereby, the indicator 14 becomes an integral portion of the alert system 26.

If desired, the indicator 14 is implemented with a voice recognition capability, or as a dialog-based device, allowing the driver 12 to operate the indicator 14 by providing natural speech voice instructions. For example, the indicator 14 may operate in association with other devices, such as passenger seat restraint system and in particular the seat belt buckles, whereby, when a seat belt buckled signal of a vehicle seat VSj is received or coupling of a child safety seat attachments are detected, the system 10 may emit a query and ask if a child 8 is present. Procedures for operating the indicator 14 depend on the type of indicator 14. When a positive vehicle's seat belt buckled signal is received, and if there are more than one vehicle seat VS that is reported as being belt-buckled, the procedure may continue and ask for the specific seat occupancy indication VSj of the one or more children passengers.

Moreover, an occupant classification-sensing device, pertaining to the operable devices 24, may be adapted to function as an indicator 14 able to deliver automatic input commands. For example, to detect the presence of a child 8, his disposition in a specific vehicle seat VSj, and/or the presence and orientation of a child safety seat, may be delivered to the control module 18. Any available occupant classification sensing and occupant detection technology may be utilized.

The indicator 14 is not limited to be implemented as one single device disposed in the interior of the vehicle 6. Another implementation of a distributed indicator 14 may include for example, an indicator 14 to be disposed in a vehicle door associated with a vehicle seat VSj. An indicator 14 may possibly also be associated with a specific door of the vehicle 6, may be fixedly coupled to the body of the vehicle 6, or may be implemented as a portable device that may serve more than one user 12. Such an indicator 14 may be coupled by wire or by wireless communication to the control module 18.

If desired, the indicator 14 may be implemented as a remote indicator device 14, operating alone and/or in combination with other indicators 14. When appropriately adapted, such a remote indicator device 14 may become the driver's 12 portable electronic entry device, or key fob 36. For example, a driver 12 using a remote indicator device 14 before a ride, may press a button related to a specific vehicle's passenger seat VSj, when that seat is occupied by a child 8, to transmit a signal to the control module 18. As described hereinabove, remote station(s), like the event notification system response center 34, may communicate information to the vehicle 6 that may be utilized by the system 10.

In other words, an indicator 14 may be configured to receive input commands and instructions selected alone and in combination from the group consisting of manual input commands, automatic input commands, vocal input commands, memory-stored input commands, memory-stored data, and remotely communicated input commands and data. In addition, an indicator 14 may be configured to return feedback signals selected alone and in combination from the group consisting of visible, audible, and tactile signals.

Input commands entered into the indicator 14 are limited only by the capacity of the application computer programs running the system 10. For example, the indicator 14 may accept input of the type of safety seat of a child 8 when the application computer programs are adapted to use the information provided. In addition, the information may be appropriately used for commanding the application of various other operable devices 24, for example an electrical shift lock device electrically controlling the gearshift lock mechanism of the vehicle 6 from being inadvertently operated to put the vehicle 6 into motion.

As mentioned hereinabove, many default instructions may be incorporated into the modes of operation of the indicator(s) 14. For example, by default, the input registration of a child safety seat's disposition in a front vehicle passenger seat may not be required, when airbag(s) are automatically suppressed in case a child 8 is detected as occupying that vehicle seat VSj. When a specific rear passenger seat wherein a child is seated is not specifically identified as seating a is child 8, another default instruction will care for the operable devices 24 to simultaneously disable the door locks and power windows' switches of both rear doors and rear windows. Likewise, a default instruction will care for the alert systems 26 to emit a message to move the front passenger seat backwards or to recommend moving the child 8 to rear seats whenever occupancy of a child is registered in the front passenger seat.

The description hereinabove permits to integrate the indicator 14 into equipment elements 20, such as in existing or retrofitted operable devices 24, for example, into a voice recognition system, a driver message center, a seat belt, a portable entry device, a personal identification device, the window controls and the like, emphasizing that the scope of the embodiments of the indicator 14 is not limited to any specific type or configuration.

Other remote devices possibly forwarding input instructions are remote stations, serving partially as an indicator 14, to provide notification to an equipment element 20 integrated in the vehicle 6. Signals received from a remote station may include the location of high-risk parking zones, along with conventional road safety instructions, and current traffic and road status.

The vehicle owner attributes registered in the system 10 may be delivered as input commands from a notification system 34 or may be entered by, for example, a vehicle information system like the driver message center pertaining to the operable devices 24. The driver message center is designed to deliver warnings to the driver 12 about faults and vehicle systems' malfunctions. Conventionally, various systems of the vehicle 6 may be programmed via the message center. Innovative set-ups and/or programmable menus are incorporated with those of the driver message center. This allows the updating of the child's identifying data, and of the number and age of children usually being driven in the vehicle 6. Further details may include name, age, and birth date. The system 10 may monitor, for example, only children in the age group between 0 and 12 years. The age of a child 8 is continuously monitored by calculation relative to the date of birth of the child 8, or relative to the date at which the age of the child 8 was entered as an input command into a memory associated with the control module 18, with reference to the calendar date provided by the vehicle 6.

A new set-up menu of the driver message center facilitates indication of high-risk parking zones. Operation is in conjunction with any vehicle positioning device, GPS device, or any other navigation device. The system 10 monitors the GPS position of the vehicle 6 taking position tolerance ranges into consideration, depending on the characteristics of the high-risk parking zones.

Starting the engine of the car 6 may be subject to a condition compelling the driver 12 to update the indicator 14. This means that the driver 12 will need to enter an input instruction into the indicator 14 to indicate whether or not a child 8 is present as a passenger. For some indicators 14 a system deactivation command may be incorporated in order to alleviate the task of the drivers 12 when the driver 12 does not have any children, or when children do not occupy the vehicle 6 on a regular basis, as may be the case for young or elderly drivers.

The input commands entered into the indicator 14 may be actively entered by the user 12, and may be communicated to the indicator 14 either from the exterior or from the interior of the vehicle 6. As described hereinabove, the input commands from the interior of the vehicle 6 may include automatic input commands delivered by an occupant classification sensing and occupant detection systems, and input commands delivered from the exterior of the vehicle may include input commands delivered by a notification system 34. For example, the input commands entered into at least one indicator 14 are selected alone and in combination from the group consisting of: child's presence in the vehicle, child's absence from the vehicle, child under adult supervision, or as memory stored input commands received from the electronic unit 380 of the ICSS 38. Data provided by the electronic unit 380 may include the ID data from the identification module 381, the signals 382f from the sensor module 382, and signals 383z from the devices module 383. As another example, the input command may indicate the exact disposition of the child safety seat or the ICSS 38 coupled to the vehicle interface 4j of vehicle seat VSj of the vehicle 6. Moreover, input commands may include indication of the presence of a pregnant woman aboard, the specific vehicle seat VSj occupied thereby, as well as indicate the presence onboard of adults classified as out of norm adults, such as incapacitated adults, small stature adults, and elderly persons.

Input commands may include indication of vehicle owner attributes such as the location of high-risk parking zones where children may be found adjacent to the vehicle, child's 8 identity data, such as number and age of children usually being driven in the vehicle, child identity data such as names, age, birth date, certain medical condition, driver 12 identity data such as name, age, birth date, certain medical condition information, contact information, and activation status of the at least one indicator. Furthermore, an input command may relate to activation of an application such as when entering "child-to-booster check-on". A delivered input command from remote stations may relate to product recall announcements for a specific vehicle 6 model and a specific ICSS 38 model, traffic conditions, safety warnings, and travel and advisory data.

Description of the Control Module

The control module 18 is a processor-operated device implemented for operation in a mode selected from the group consisting of centralized control, hybrid control, hybrid control and decentralized control. This means that the control module is, if desired, a stand-alone module, or operates in distributed mode, possibly integrated within at least one equipment element 20 as one single unit or embedded in a plurality of elements of the equipment 20.

It is noted that the system 10 described hereinabove is an example only, selected for the ease of description. When adapted to the supplier-based nature of the automotive industry, the distribution of the control module 18 into various subsystem-controllers may be expected. For example, the passenger restraint system may include a sensing and diagnostic module, and while conventionally having an occupant classification module, may also deal with the activation of alert signals when the vehicle 6 is detected as residing in non-traffic parking mode.

Furthermore, although not shown in the Figs., the control module 18 may support a processor configured to operate in conjunction with a computer memory able to store instructions and computer programs saved on a computer-readable medium. The processor is configured to execute the instructions and the stored computer programs. The computer memory is thus fed with a computer readable medium storing instructions and programs that, when executed by the processor, causes the processor to perform each one of the commanded processes, or method steps. Conventionally including volatile and nonvolatile memory components to keep the memory storage alive, the memory allows the retrieval of relevant data from and/or updating of the system 10, in particular of input instructions entered into the indicator 14 by the driver 12 or by a user.

Moreover, the control module 18 may be configured for real time operation of the processor in conjunction with the equipment elements 20, thus with the sensors 22, the operable devices 24, and the alert systems 26. The control module 18 may receive information from the equipment elements 20 to manage, command, and control the operation of those equipment elements 20. Furthermore, the control module 18 may be coupled and interconnected with any one of the plurality of equipment elements 20, and may be operable by interactive communication between the at least one indicator and the user. The control module 18 may be configured to control activation and deactivation of at least a selected element out of the plurality of equipment elements 20, including at least a selected alert system 26 out of the plurality of alert systems 26.

The control module 18 may thus have a processor operating in association with a memory adapted for storing commands and computer programs, and an input command received by the at least one indicator 14 may be selected to be stored in memory as either one of both a command stored for one drive only and a command stored for more than one drive of the vehicle.

The report module 16 may be configured to report a status condition of any sensor 22 out of the equipment elements 20.

The report module 16 is, if desired, operated as a stand-alone module, or operated in distributed mode, possibly integrated as one single unit into another element of the equipment elements 20, or embedded in a plurality of elements of the equipment elements 20. Like the control module 18, the indicator 14, the report module 16, and any other out of the equipment elements 20 and components of the system 10 may include a processor having a memory for storing data therein, and means for reading and executing computer programs saved on processor readable means.

Figure 3A:
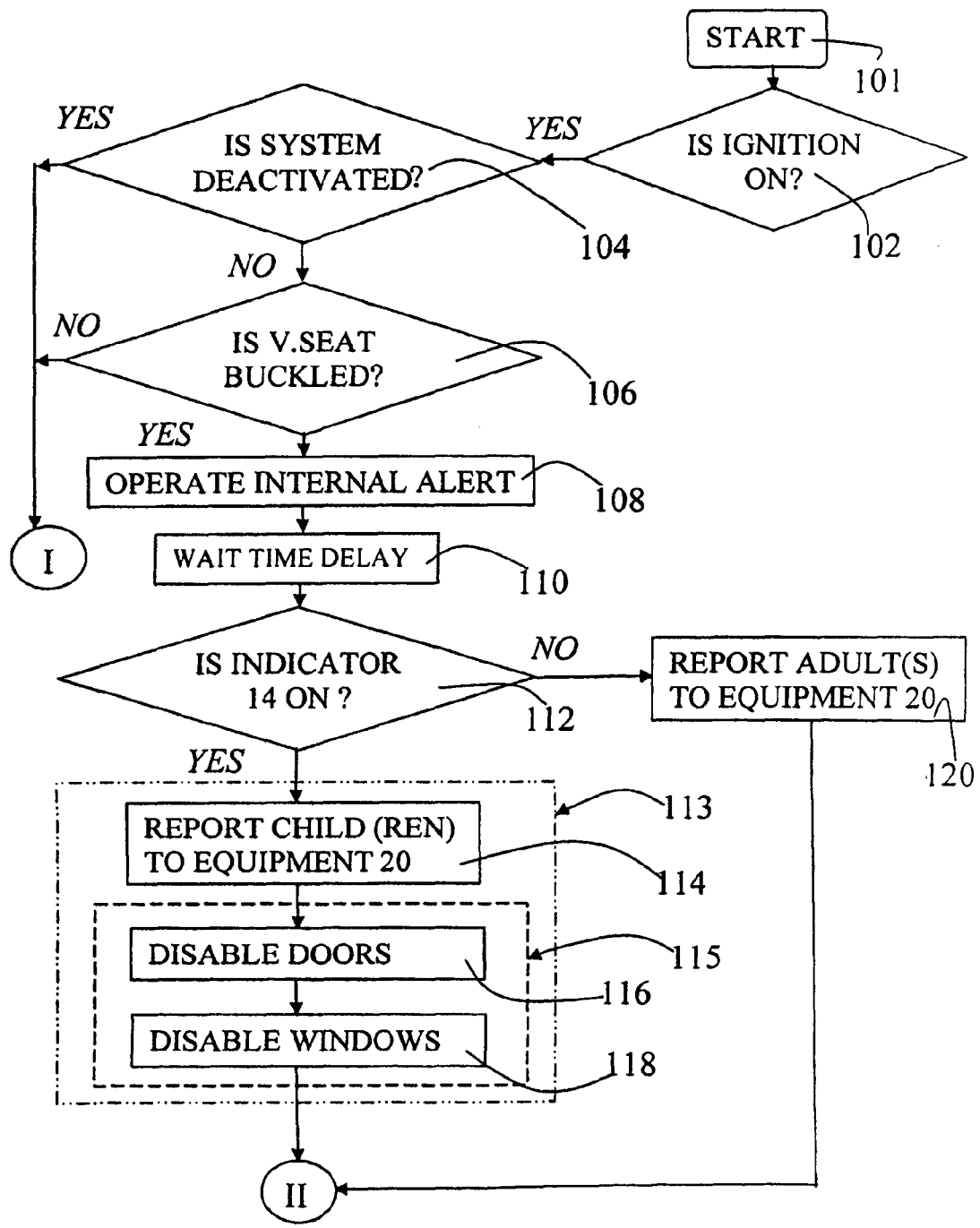
FIG. 3 illustrates a flow diagram of a logic process for operating the system shown in FIG. 1.
Figure 3B:
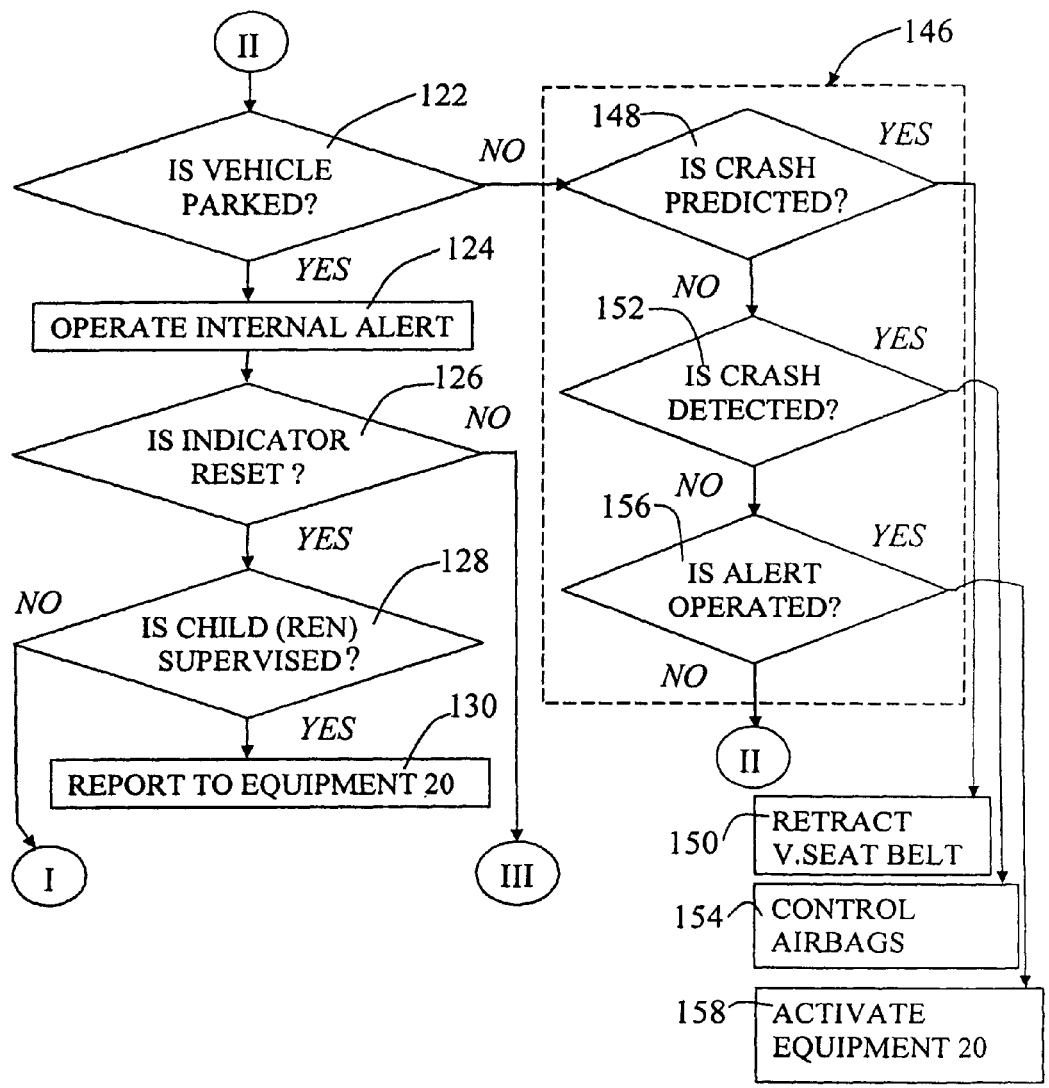
Figure 3C:
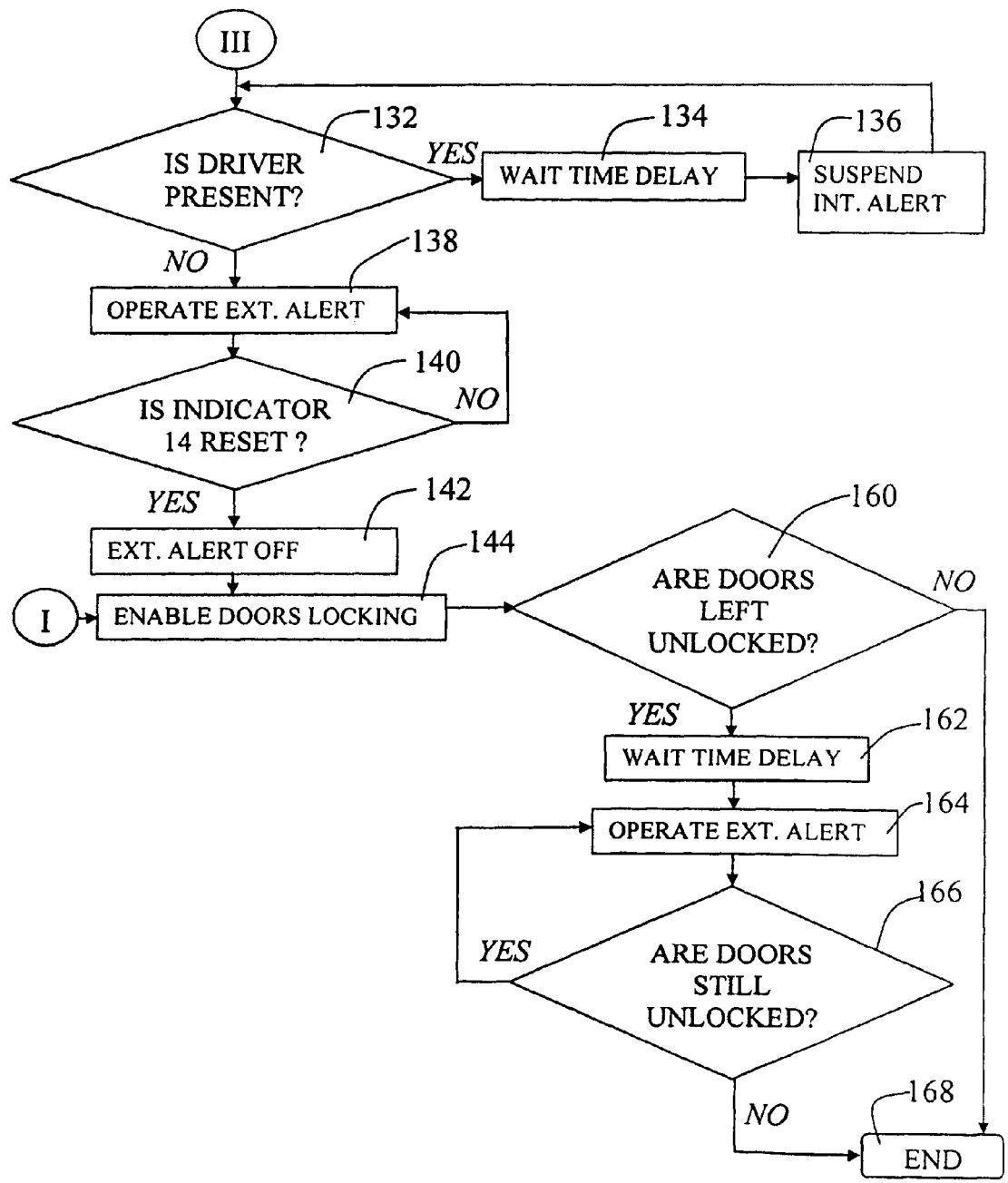

Reference is now made to FIG. 3 illustrating a flow diagram of a logic process 100, or process 100, operative with the system 10, as an example only. The process starts with step 101. FIG. 3 is shown on three different sheets as FIGS. 3(A), 3(B), and 3(C).

In step 102, the system 10 becomes operative when the driver 12 turns-on the ignition key in either the switch accessory-mode or the switch engine-starting mode. However, in some other embodiments, in step 104 the driver 12 may opt to deactivate the system 10, when there is no use or desire for its operation on a regular basis. Control then proceeds to step 144, to enable locking of the doors of the vehicle 6, while all buckled vehicle seats are regarded as buckling an adult, or else to step 106. When a locked passenger seat belt is detected in step 106, then control passes to step 108, but otherwise, unlocked passenger seat belts, or lack of load on the vehicle seat VS, indicates that there are no passengers in the vehicle 6 and control again proceeds to step 144. The indicator 14 may also provide indication that an ICSS 38 is coupled to a vehicle interface 4j, associated with a specific vehicle seat VS, by use of either LATCH or ISOFIX attachments, and therefore, the use of the vehicle seat belt of the vehicle seat VSj is not expected.

Step 108 activates at least one alert signal out of the internal alert systems 26 to attract the attention of the driver 12 to the need to enter at least one instruction into the indicator 14, thus to set the indicator 14. This is the case when a regular child safety seat is employed, in contrast with an intelligent child safety seat, or ICSS 38, as described hereinabove with reference to FIG. 2. When the system 10 includes, for example an indicator 14 equipped with voice recognition, or capable of handling dialog-based voice commands, then the driver 12 will be asked if a child 8 is present in vehicle 6, and other requests may follow. This step requires a response from the driver 12, in contrast with other indicators 14 whose operations are not interactive relative to the detection of vehicle seat VS belt use.

For proper operation of the system 10 a user 12 is required to indicate via an indicator 14 if a child 8 is introduced into the vehicle 6, either prior to, or after running the engine of the vehicle 6.

Figure 6:
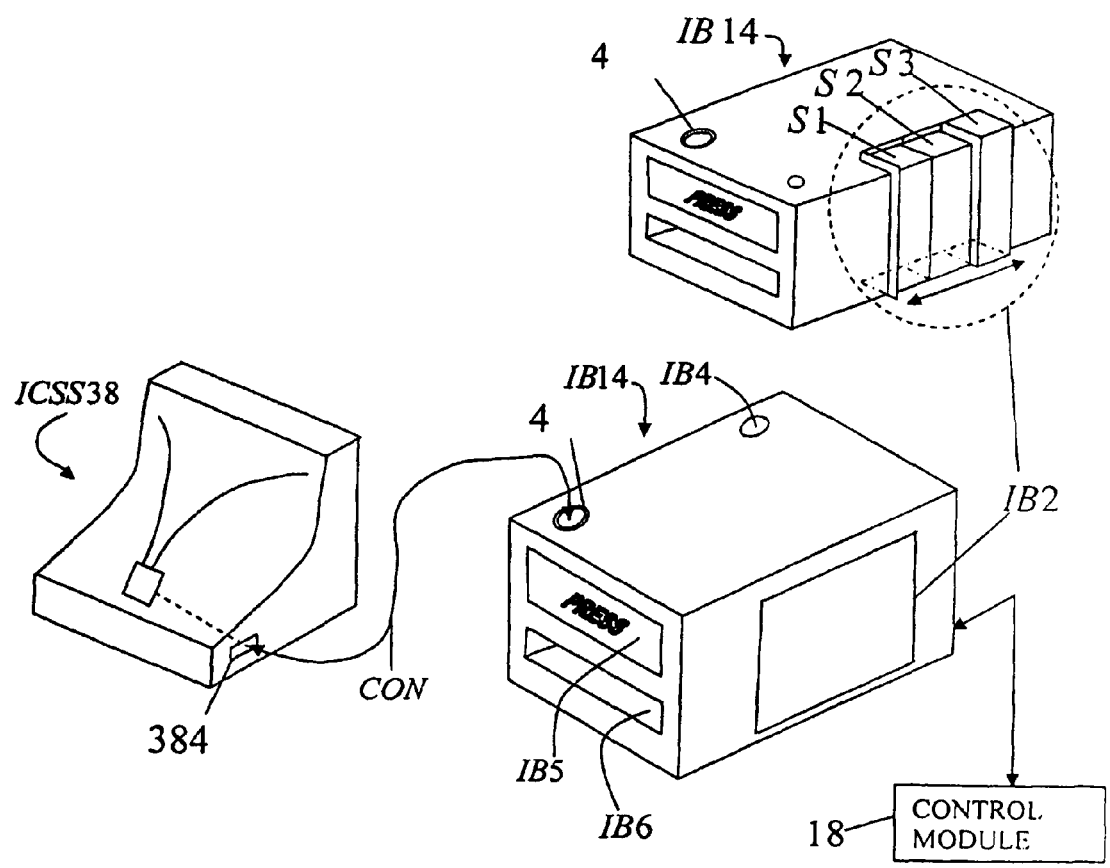
FIG. 6 illustrates an intelligent vehicle seat belt buckle operative with the system shown in FIG. 1.

In step 112, after a time delay 110, if a user 12 indicated that a child 8 is present in the vehicle 6, then control proceeds to step 114. The driver 12 is required to enter at least one input command into the indicator 14 stipulating child 8 related data. An embodiment of the ICSS 38 may integrate the child seat interface 384 and the mechanical interface disposed for coupling the ICSS 38 to a vehicle seat VSj. When the ICSS 38 functions as an indicator 14 of the system 10, the user's 12 actions of coupling of the child seat interface 384 to a vehicle interface 4j, and bucking/unbuckling the ICSS's 38 buckle are regarded as user 12 entered input commands. When the ICSS 38 type is identified as being a booster seat, then the use of a seat belt is expected. Otherwise, by default, control passes to step 120, and the equipment elements 20 register the buckled passenger seat belt as pertaining to an adult 13. When an intelligent buckle IB 14, as described hereinbelow with reference to FIG. 6 is in use, then further classification of other types of adults, for example a pregnant woman, is enabled. It is noted that the driver 12 may be specifically required to indicate the absence of a child 8. Else, when a child 8 is present, the control module 18 controls, commands, and manages operation of the system 10 with respect to the equipment elements 20, to the driver 12, and to the child 8.

Step 112 may acknowledge the reception of an input command for input into the control module 18, by returning a feedback signal to the driver 12, indicating that the system 10 is set for operation. Feedback to the driver 12 may be reported to an appropriate indicator 14 if desired.

Receipt of information by the indicator 14 may be acknowledged by illumination of a warning light, indicating the presence of a child 8, a warning light that may stay lit during the child's presence for the current ride, or operating in association or in combination with a belt buckling reminder warning light. When the at least one indicator 14 is set, thus when an input has been entered by a user 12, then control flows to step 113. In the negative control continues to step 120.

Step 113, framed by a dash and double-dot line, is regarded as a pre-ride step wherein child 8 related data is delivered to relevant devices pertaining to equipment elements 20. To keep a long list of operable devices 24 short, only a few options are listed in step 115, although a plurality of such operable devices may be available. Prior to shifting the vehicle 6 into drive mode, step 115 is operated in response to the indicator 14 indicating that the vehicle seat VSj is occupied by a child 8.

Step 114 updates all the appropriate equipment elements 20, thus the relevant operable devices 24, including airbags and restraints modules, the event notification device, the event data recorder, and the vehicle-to-vehicle communication interface. In step 114, the control module 18 commands the operation of adequate warnings. This occurs, for example, when defective or wrong installation of the ICSS 38 is detected. For example, when a recall announcement for a specific model of a child safety seat; distributed by say the notification system, is found to match the model of the installed ICSS 38, or when incompatibility is detected between child 8 and an ICSS 38, or between the ICSS 38 and either the vehicle 6 or the vehicle seat VSj. Real time instructions and warnings may be delivered to the user 12 including, but not limited to a requirement to: (i) switch the disposition of a rear facing infant seat installed in a front passenger seat; (ii) move the front passenger seat backwards; (iii) override and re-set an incorrectly set air bag cut-off switch; (iv) override and inform of a seat belt misuse; and (v) inform that smoking is prohibited.

In step 115, framed by a dashed line, all power-operated devices are adjusted to meet child 8 safety requirements, even though only two devices are illustrated as steps 116 and 118. Therefore, in steps 116 and 118, a central door locking system may include, besides locking all vehicle doors, the updating of operable devices 24 to automatically disable operation of the interior door handle and of the power window switch adjacent the seat occupied by the child 8.

Control flows from step 115 to step 122. The vehicle 6 may reside in gear drive mode prior to step 122, while in step 122 the system 10 checks to find out whether the vehicle 6 is at standstill in non-traffic parked mode, with either a running engine or with the ignition-off.

Should the parking brake be detected as being engaged, then control passes to step 124, and activates the first level of alert signals, thus the internal alert signals of the alert system 26, to draw the attention of the driver 12 to the need to retrieve the child 8 from the vehicle 6, or to reset the indicator 14. If desired, removal of the ignition key out of the ignition switch is prevented, for a predetermined lapse of time or until after the child 8 is reported as having been retrieved from the car 6, and the locking of the doors of the vehicle 6 is permitted only thereafter.

Next, in step 126, if the driver 12 responded to the internal alert signals by resetting the indicator 14, or by unbuckling a passenger seat belt of the vehicle seat VSj occupied by a booster seat for example, thereby providing input to the indicator 14, then control goes to step 128.

If step 128 detects that instructions entered into the indicator 14 point to a child 8 being under adult 13 supervision while the driver 12 left the vehicle 6, then control passes to step 130 wherein all alert signals are commanded to be suspended. In step 130, child safety preventative measures include the automatic disablement of operation of devices such as roof-panel, power window switch, the automatic disconnection of power supply to the cigarette lighter to prevent a fire, and application of shift interlock to prevent the vehicle 6 from being accidentally set into motion. Else, control flow continues to step 144, indicating that the child 8 was retrieved out of the vehicle 6.

Step 126 is now considered again for the case when the indicator 14 was not reset after the first-level alarm signals were emitted, and control passes to step 132. Steps 132 to 136 now demonstrate a situation wherein the driver 12 and a child 8 are present in the non-traffic parked vehicle 6.

By step 132, if the driver 12 is detected as being absent from the driver's seat, then in step 138, the control module 18 will activate the second level of signals, thus the external alert signals of the alert systems 26. This includes disabling of the door lock mechanism of the vehicle 6, and possibly sounding the horn, operating the external lights of the vehicle 6, and activating the siren of the burglar alarm. As a last resort a message to a notification system or to a user 12 is communicated.

Then, in step 140, if the indicator 14 is reset, indicating that the child 8 is out of the vehicle 6, control passes to step 142.

In step 142, activation of the external alert signals is stopped, and in step 144 locking the doors of the vehicle 6 is enabled.

Else, if the indicator 14 is not reset in step 140, and the child 8 is not retrieved from the vehicle 6, control returns to step 138 and the external alert signals remain activated.

Reference is now made again to step 122, for the case when the vehicle 6 is not in non-traffic parked mode, thus in driving mode, as represented by block 146 which is framed by dashed lines. All the operable devices 24 are active during the ride of the vehicle 6 and are responsive to triggering-event detection, in accordance to signals sampled by the sensors 22, to instructions received by the indicator 14, and to signals received from the control module 18.

Various operable devices 24 may be included in the block 146, such as including a driver condition warning systems, a driving assisting system, a climate control, a personal entertainment device, a collision prediction device, a crash event detection device, a child-parking alert, and possibly more if appropriate.

If a crash is predicted, as in step 148, then the collision prediction device will exert an appropriate retraction force on the seat belts prior to collision, as by step 150, especially to accommodate the safety of a child 8 seated for example in a booster seat and of passengers classified as special adults. Special adults, or out of norm adults are incapacitated adults, pregnant women, small stature adults, and elderly persons. Else, if a crash event is detected, as in step 152, then the crash event detection device will cause adequate airbag deployment, as shown in step 152. Adequate airbag deployment is provided according to airbag deactivation criteria controlled by signals generated by the control module 18, in response to input entered a priori via the indicator 14. Appropriate deployment or total suppression of the airbags, as well as reduced deployment speed, and control of the shape and size of the airbag(s) may also be based on the operation of the ICSS 38 identifying its identity, including seat type, seat restraints, seat dimensions, and possibly more data when available. After a crash, an automatic collision notification system is used to communicate child 8 related data, such as including child 8 presence and position, child 8 identity data, as well as other vehicle seats' occupancy data together with conventional data such as vehicle 6 location, and the like.

If an alert signal is operated, such as the child-parking alert, as in step 156, then the activation of equipment elements 20, such as internal alert signals and of the observation system is operated, as in step 158. The child-parking alert is triggered in response to detection of vehicle 6 motion within an area predetermined as a high-risk parking zone. First, internal alert signals of the alert system 26 are put to action to raise the driver's 12 alertness, enable driver 12 appropriate reaction time and equipment elements 20 activation times. To improve visibility of otherwise considered blind spot areas, the driver 12 may employ the automatically activated observation system that is aimed at capturing images of blind spots, and use dedicated mirrors to assist the driver 12 and prevent accidents.

Step 146 may also monitor the status of a smoke detector to actively warn the driver 12 against smoking in the vehicle 6, when a child 8, perhaps also identified by age, is present.

The description now jumps to step 160, just following the vehicle's door locking enabling step 144.

In step 160, if the driver 12 left the doors of the vehicle 6 unlocked, when the vehicle 6 is parked with a running engine or with the ignition-off, or when detected as parking in a high-risk parking zone, then after a predetermined time delay shown in step 162, external alert signals are activated in step 164 to indicate that the doors are unlocked. If the doors of the vehicle 6 are detected as locked in step 160, then all is safe and the control cycle comes to an end in step 168.

After a predetermined time delay as shown in step 162, which follows the detection of unlocked doors, as by the query of step 160, control passes to step 164. The external alert signals are activated in step 164. Such external signals may include sounding the horn, the burglar alarm, and flashing the external lights of the vehicle 6. Control flows to step 166, to find out if the doors are still unlocked, and if so, to repeat the loop via steps 164 and again to step 166, until the doors are finally locked and the control cycle stops with step 168.

When a child 8 manages to gain access to the vehicle 6 as in step 102, thus without permission, the report module 16 will deliver a message to the control module 18 reflecting actuation of a selected device out of the operable devices 24. For example, in response to receiving a triggering signal from the interior trunk release apparatus to activate at least one alert systems 26 and automatically release the trunk lid. In the same manner, the control module 18 may be configured to prevent the accidental setting into motion of the vehicle 6 by use of a shift interlock application operative in response to data provided by the indicator 14.

It is understood that a child 8 refers to both a child 8 usually being driven in the vehicle 6 and a child 8 as a guest who is occasionally being driven in the vehicle 6. Any child 8 riding in the vehicle 6 should be seated in a child safety seat or in an ICSS 38, and the system 10 is configured to manage the protection of any child 8. However, when the indicator 14 is adapted to receive input commands, such as vehicle owner attributes and memory-stored data delivered from a specific ICSS 38, then the control module 18 is adapted to command the activation of specific child-safety embodiments. It is further understood that when the vehicle owner attributes are registered with more than one child 8, then the control module 18 may be configured to associate the specific ICSS 38 to the specific child 8 seated therein.

Figure 4:
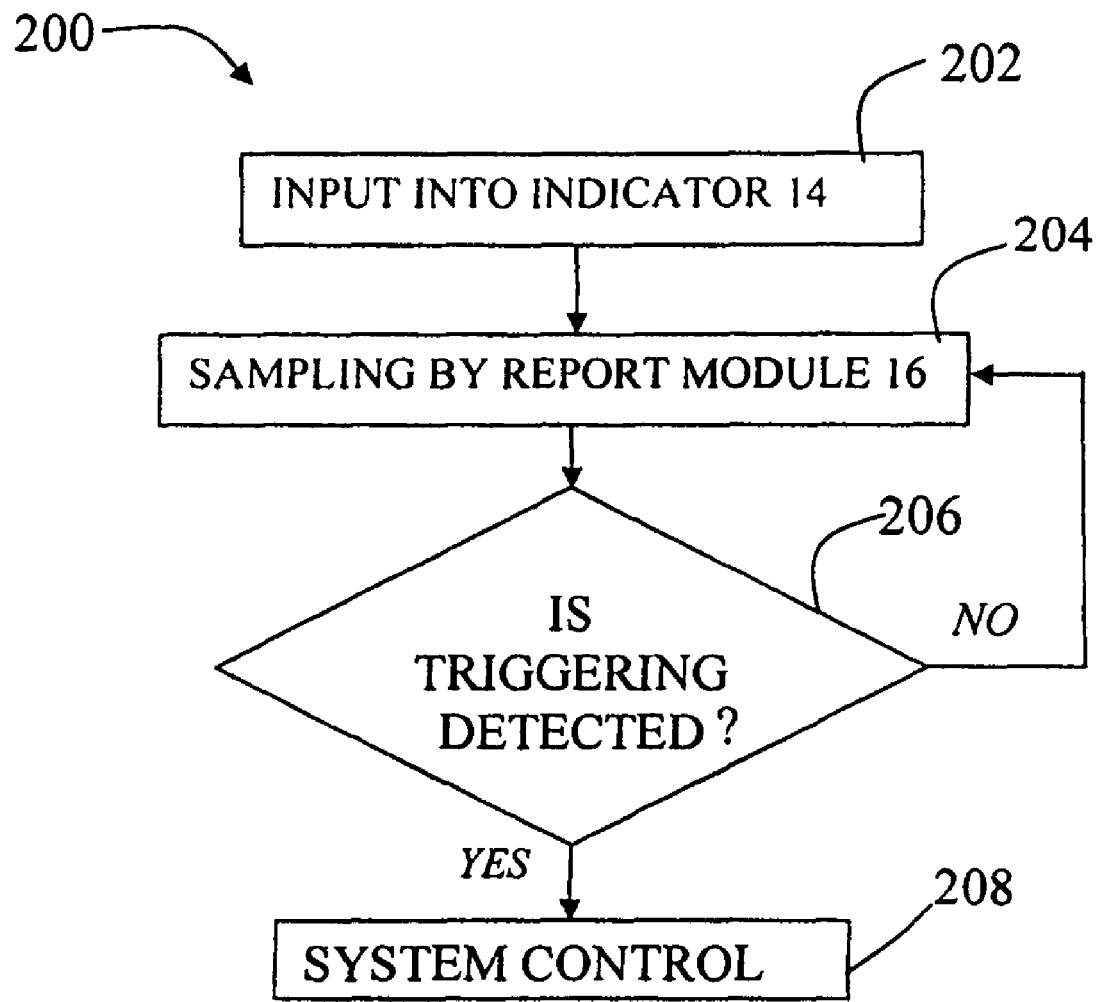
FIG. 4 shows the concept of operation of the system depicted in FIG. 1.

In FIG. 4 reference is made to the concept of the method serving as a basis for the operation of the system 10.

Basically, the system 10 has first to be fed with input instructions reflecting the vehicle seats' occupancy in the vehicle 6, and other child relevant data, as shown in step 202. The system 10 may be fed with a manual input command entered by a user 12 and/or an automatic input command delivered by an occupant classification sensing and occupant detection system. This applies in particular to the occupancy by any child passenger. In addition, stored data of many types may be communicated from in-vehicle and or ex-vehicle sources, in direct or indirect association to input command(s) entered by the user 12 into the indicator 14. In step 202, appropriate occupancy data are entered as input into an indicator 14, which is adapted to receive input instructions and may return feedback signals. Therefore, step 202 is accepted as the step wherein the system 10 child related data requirements are fulfilled by the indicator 14.

Second, in step 204, the report module 16 samples the status of the various elements of the equipment elements 20, including sensors 22, operable devices 24, alert systems 26, and if available, of the electronic unit 380 integrated in the ICSS 38. The equipment elements 20 may include most of the elements of the car 6 participating in the operation of the system 10 as well as alert systems 26 needed for delivering various safety-related alert signals.

Third, in step 206, if an event triggering the system 10 is detected, then control passes to step 208. Else, control returns to the sampling status of step 204.

Step 204 may include various reports by the equipment elements 20 pointing, for example, to potential or imminent dangers and event reports, such as crash prediction, or crash occurrence, or child related alerts regarding situations involving a vehicle parked in a non-traffic mode, a child-parking alert, a doors-left-unlocked alert, stipulating detection of driver 12 error actions or faulty behavior.

Fourth, in step 208, the control module 18, that is configured to control, manage and operate the system 10, will command activation or deactivation of the system 10, either directly or by updating the equipment elements 20 with instructions entered into the indicator 14.

Therefore, according to FIG. 4, it is possible to implement the concept of the method serving as a basis for the operation of the system 10 in accordance with the following: According to step 202 the at least one indicator 14 provide to the control module 18 first signals indicative of the received input commands, and according to step 204, the equipment elements 20 are configured to provide the control module 18 with second signals indicative of the detection of an event triggering the system 10.

Thus, according to step 208 the control module 18 accepts the presence of first signals and the presence of second signals as a danger signal indicative of a child 8 being exposed to the danger, and the control module 18 executes control programs responsive to the received first and second signals to control, manage, and operate the system 10.

According to FIG. 4 it is possible to implement a method and systems associating the child 8 to a specific vehicle seat VSj and with available either entered or acquired data to provide an integral protection envelope to the occupants 9 of a vehicle 6, and in particular to at least one child 8.

The method and the systems described hereinabove all have a control module 18 for the operation of the following steps:

executing commands and receiving commands to operate and control operation of at least one element out of the equipment elements 20, detecting driver 12 errors and alerting, warning, and instructing the driver to correct errors, detecting potential hazards and alerting, warning, and instructing the driver 12 to avoid exposure to the potential hazards, detecting incorrect use or misuse of a device to automatically override signals attributed to the incorrectly used or misused device, checking for mutual compatibility between a seated child 8 and: the specific ICSS 38 in which the child is seated, the vehicle seat VSj, and the vehicle 6, detecting misuse of the ICSS 38 and warning the driver 12 of inadequate child safety seat installation, and when appropriate, advising the driver to initiate a check as to eligibility of the child 8 to be restrained in a booster seat, detecting improper driver behavior and advising the driver to take appropriate corrective action when necessary, controlling communication with nearby riding vehicles, channeling services to the driver 12 and to the child 8, and operating the system prior to the ride and during the ride of the vehicle, 6 when approaching a high-risk parking zone, and when the vehicle is parked.

The method and the systems described hereinabove are configured to protect at least one passenger child 8 being driven by a driver 12 in a vehicle 6 as a passenger, or at least one child when outside and adjacent to or in the vicinity of the vehicle. It is assumed that the vehicle has equipment elements 20, and that the method and the systems operate the steps of:

associating the at least one child passenger with an identified passenger seat VSj, providing automatic disablement of an interior door-opening-handle and of a power window-switch adjacent to the identified passenger seat, in response to either one of both or to both, a signal commanding locking of all the doors of the vehicle, and a dedicated signal command, providing either one of both controlling airbag reduced speed/size and shape of deployment and when appropriate, suppressing deployment of airbag(s) associated with the identified passenger seat VSj, applying appropriate pre-tension belt force to the identified passenger seat VSj prior to detection of an unavoidable collision, communicating automatically with a crash notification system response center 34 to report presence of the at least one child, activating an alert signal to remind the driver 12 that the at least one child 8 is left unattended in the vehicle 6 when the vehicle resides in parked mode, including a child's presence message in a vehicle-to-vehicle communication protocol, activating a child-parking alert and a doors-left-unlocked alert when conditions therefore are appropriate, overriding signals attributed to incorrect use or misuse of devices by a user 12, detecting driver errors and providing alerts, warnings, instructions and guidance advising correction of driver errors, warning the driver 12 against smoking in the interior of the vehicle, advising the driver 12 to initiate a check to determine if the child 8 is eligible to be restrained in a booster seat, moderating operation(s) of climate control device(s), cooperating with driving assisting systems and driver condition warning systems, channeling services to the driver 12 and/or to the at least one child 8, controlling the vehicle's door locks to prevent a child 8 from gaining access to the vehicle 6 when parked, controlling disconnection of power to a cigarette lighter to prevent accidental setting on fire of the vehicle, notifying the driver 12 of the activation of an interior trunk-lid release apparatus, and recording of a predetermined set of child-related-data to enable accident inquiry.

The method and the systems described hereinabove may also include the association of an at least one passenger child 8 with an identified vehicle seat VSj that is achieved by the at least one child's presence being indicated by a user 12 entering input commands into an indicator 14 adapted to receive the input commands, and/or by automatic input commands delivered by an occupant classification sensing and detection system.

The association of a passenger child 8 with an identified vehicle seat VSj is achieved by coupling an ICSS 38 to a vehicle interface 4j to facilitate checking for mutual compatibility between the seated child, the specific ICSS 38 into which the child 8 is seated, the specific vehicle seat VSj, and the vehicle 6.

The association of data related to a passenger child 8 also includes vehicle owner attributes registered in the system to allow execution of the step of advising the driver to initiate and execute a child-to-booster compatibility check, and to further allow execution of the steps of activating a child parking alert when appropriate, activating a doors-left-unlocked alert when appropriate, and applying available data to operate at least one device selected from the group consisting of a key-interlock, a brake-to-shift interlock, and a transmission interlock, to prevent accidental setting into motion of the vehicle.

Figure 5:
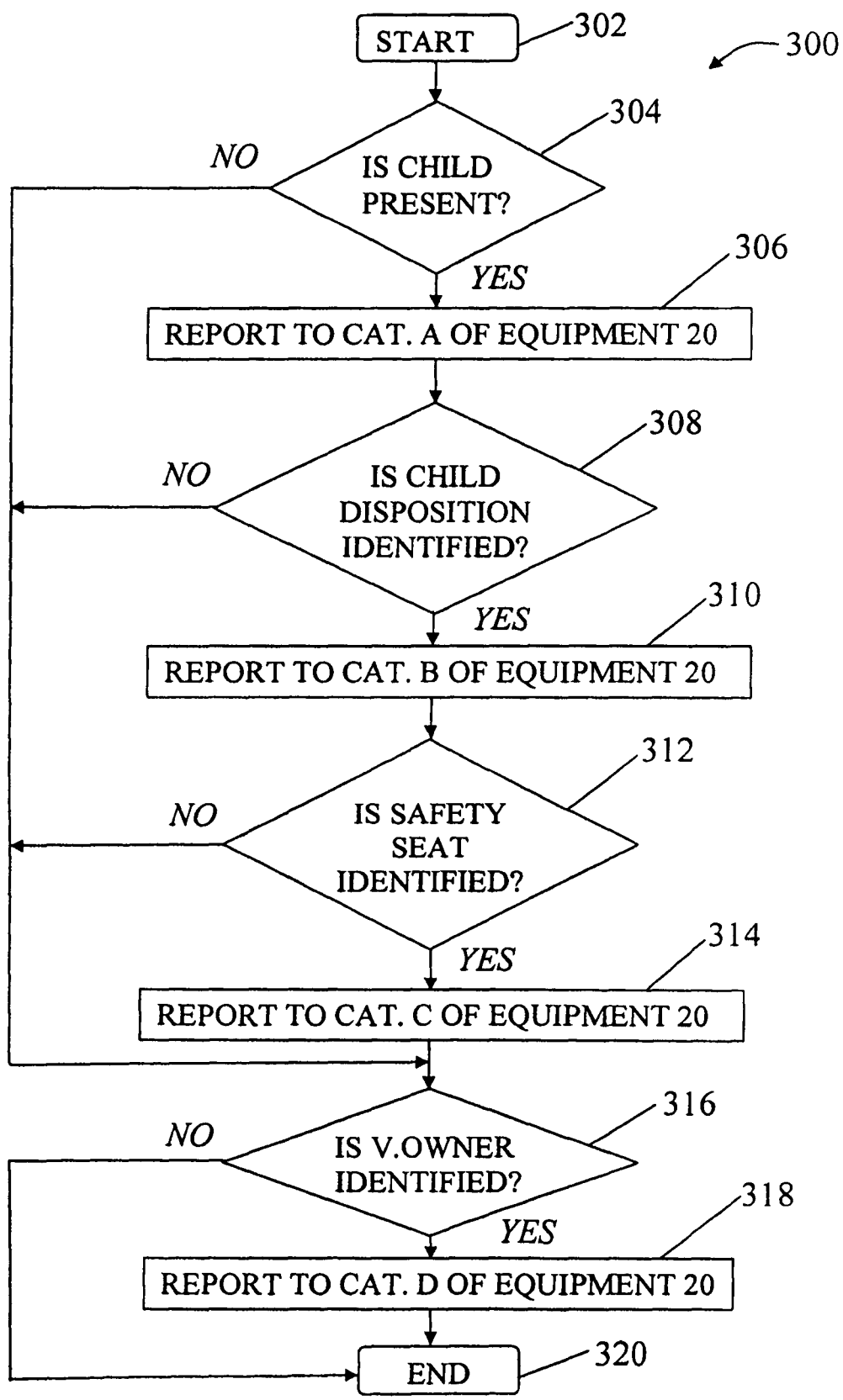
FIG. 5 is a flowchart showing another example of operation, of a method and a system.

FIG. 5 depicts a flowchart diagram showing the concept of operation of a method implementing at least one child 8 protection envelope against vehicle-presented hazards wherein the provided protections means are shown as a logic process 300 in correlation with child related data. The process starts with step 302.

First, in step 304, if a child 8 is identified as being present in the vehicle 6, then in step 306 the child's 8 presence is reported to the equipment elements 20 pertaining to category A. Category A relates to equipment elements 20 which enable child related applications that require only the mere knowledge of child's 8 presence in vehicle 6. Category A equipment elements 20 include as many as r different equipment elements where r=1, 2, 3, . . . , n14, and n14 is a finite integer. The equipment elements 20 of category A relate to applications including: driver reminder dealing with warnings delivered to the driver 12 when a child 8 is left unattended in a parked vehicle 6, event data recorder, notification device, second-hand smoke warning, cigarette lighter automatic disablement, automatic collision notification, driver condition warning, driving assistance, traffic and safety advisory, travel and navigation, commercial and entertainment services, communication interfaces such as V-V communication interface, and many more if desired.

Second, in step 308, if a child 8 seating position in a specific vehicle seat VSj is identified, then in step 310 a report associating the child 8 to that specific vehicle seat VSj is delivered to the equipment elements 20 pertaining to category B. Category B relates to equipment elements 20 which enable child related applications, requiring designation of the exact vehicle seat VSj wherein a child 8 is seated. Category B equipment elements 20 include category A elements and additional equipment elements 20 including as many as v elements where v=1, 2, 3, . . . , n15, with n15 being a finite integer. Category B equipment elements 20 may include: the occupant restraint systems operative to regulate the airbag(s) inflation and their total suppression, the belt pretension and/or belt load limiters, the automatic climate control device, the door locks and power window modules, the central door locking, detection means to override and warn user of incorrect settings and misuse of devices, such as the airbag-cut off switch, and the seat belt misuse. In addition, category B equipment elements 20 may include instruction(s) to the user 12 to shift the front passenger seat backwards, and to move the child 8 to a rear seat.

Third, in step 312, if an ICSS 38 is identified, and found coupled to a specific vehicle seat VSj, then in step 314, an appropriate report is communicated to category C equipment elements 20. Category C relates to equipment elements 20 that enable child related applications, which operations also requires specific data to be delivered from ICSS 38. Category C equipment elements 20 include category B equipment elements, and further equipment elements include as many as h different equipment elements, where h=1, 2, 3, . . . , n16, with n16 being a finite integer. Category C equipment elements 20 include means to provide ICSS 38 installation instructions in real time, detect a defective or wrong installation or a misuse of the ICSS 38, to detect incompatibility between an ICSS 38 with: the vehicle 6, a vehicle seat VSj, and with a child 8. Misuse of the ICSS 38 may relate to detection of an ICSS 38 used beyond the expiration date or after being involved in a crash, and detection of use after a recall announcement for the specific ICSS 38 has been issued. For example, data received from the identification module 381 of the ICSS 38 allows the identification of seat type, seat orientation, seat dimensions, seat restraints, and more if available, and allows adjustment of the occupant restraint systems. Thus, a recommendation to move the child 8 to a rear seat may specifically relate to a child 8 seated in a rear facing infant seat. In the same manner, the suppression of airbag inflation may be correlated to an ICSS 38 whose ID data seat restraints are identified as ISOFIX and LATCH attachments. As another example, safety bag(s) inflation or suppression may relate to ICSS 38 seat dimensions. Furthermore, it is possible to enable, disable or partial enable the operation of selected devices such as the power window switch.

Fourth, in step 316, if vehicle owner attributes are identified, then in step 318, that data is reported to category D equipment elements 20. Vehicle owner attributes, or identity, family and personal information, may include identity data such as names, age, contact information, certain medical condition information, high-risk parking zones, and more if desired. Category D equipment elements 20 relate to applications the operation of which are based on vehicle owner attributes, and including as many as y different elements where y=1, 2, 3, . . . , n17, with n17 being a finite integer. Category D equipment elements 20 relate to child-parking alert, doors-being-left-unlocked alert, shift interlock, seat belt and safety bag(s), collision notification including communication of specific child's 8 identity data, personalizing of services directed towards the occupant 9 such as entertainment services, manage graduation of a child to an appropriate restraint system such as providing advise to transfer a child from a rear facing infant seat to a front facing child seat and perform child-to-booster check, and more if desired. Selected equipment elements 20 pertaining to categories A, B, and C may also utilize vehicle owner attributes.

In steps 304, 308 and 312 when child 8 related data is not registered with the system 10, then in step 316 vehicle owner attributes based applications are enabled, but otherwise control proceeds to step 320, to end the process 300.

The definition of vehicle presented hazards includes all hazards associated with a vehicle 6, with the operation of the vehicle system 10, with the user 12, and with a child 8. That definition also applies to operations that are not hazardous but may influence the child's 8 comfort, such as related to climate control and entertainment services for example. It is noted that in the description related to FIG. 5 only, the system 10 is included in the equipment elements 20.

The method and the systems described hereinabove are intended for implementing protection to protect at least one child 8 from hazards presented by a vehicle 6, the vehicle having equipment elements 20, and the method comprising the steps of retrieving data selected alone and in combination from the group consisting of data related to the at least one child as: a passenger of the vehicle, an occupant of a specific vehicle seat, an occupant of an ICSS operatively coupled to the vehicle seat and associated with vehicle owner attributes, and operating equipment elements according to the retrieved data, the equipment elements being selected alone and in combination from the group of equipment elements consisting of category A, category B, category C, category D.

Furthermore, the retrieved data related to the at least one passenger child 8 may be fed by either one of both or by both, means of input commands entered by a user 12 into an indicator 14 adapted to receive input commands, and by means of automatic input commands delivered by an occupant classification sensing and detection system.

Tables 1A to 1C summarize the capacities of the embodiments of the system 10, which were described in detail hereinabove.

Tables 1A, 1B, and 1C list exemplary operations, respectively, prior to ride operations, during ride operations, and parked mode operations, but does not include all the operations described hereinabove. The system 10 is configured to provide a child 8 with an integrative protection suite, or protection envelope, in response to the complete cycle of operation of a vehicle 6. The embodiments of the systems 10 are not limited by/to the schematic presentation of Tables 1A to 1C, which are solely designed to ease the demonstration of the capacities of the system 10, that is configured to treat the set of potential dangers in a holistic fashion. The control programs managed by the system 10 are configured for the execution of at least one operation out of the operations selected from the group consisting of prior to ride operations (see Table 1A, prior to ride), during ride operations (see Table 1B, during ride), and operations when the vehicle is parked (see table 1C, parked mode).

TABLE 1A

Prior to Ride Operations
Table 1A—Protection Envelope—Cycle of Operation
of a Vehicle: Prior to Ride 1. Crash preparedness checks a  ICSS 38
     Detect incompatibilities between the ICSS 38 and the vehicle
     6, the vehicle seat VSj and the child 8.
     Provide real time installation instructions
     Detect ICSS misuse or wrong installation
     Detect ICSS use beyond expiration date and after being
     involved in a crash.
     Detect ICSS recall Announcement.
  b  Undesired disposition of child safety seat relative to a frontal
     passenger airbag
     Advise moving a rear facing infant seat from the front
     passenger seat to the rear seats.
     Recommend or command a backward movement of the front
     passenger seat.
  c  Airbag cut-off switch
     Detect incorrect setting of the frontal airbag cut-off switch that
     is a mismatch between the switch setting and the class of the
     occupant of the front passenger seat.
  d  Seat belt misuse
     Seat belt of vehicle seat VSj is detected buckled and an
     ICSS 38, identified as being equipped with ISOFIX or LATCH
     attachments is detected as being coupled to the vehicle seat VSj.

2. Door locks, Power windows, and Power accessories settings e  Door-opening—handle
     Automatic disablement of operation of a power child lock
     Recommend the driver 12 to check the status/setting of a
     manually operated child lock.
     Power window switch
     Automatic disablement of operation of the switch adjacent the
     child 8.
     Allow selective operation.

3. Run-over/backover accidents—Child parking alert

TABLE 1B

During Ride Operations
Table 1B—Protection Envelope—Cycle of Operation
of a Vehicle: During Ride 4. Child-central-doors-locking Locking all Doors (automatic/manual triggering)
Automatic disablement of the power window switch from operation;
Automatic disablement of the door-opening handle from operation.

5. Pre Crash

Seat Belt-pretension—applying selective force to the seat belt of a
vehicle seat Vsj detected as used by a child occupying a booster seat.

6. Crash protection

Crash protection
Control of the deployment or total suppression, as well as control of
the deployment speed, shape and size of airbags relative to the child
8.
All types of airbag.
Any passenger seat VSj.
ICSS 38—ID data of the identification module 381: reporting at least
the identification of seat type, seat restraints, seat dimensions.
ICSS 38—sensor signal 382f of the sensor module 382: reporting at least
the presence/absence of child 8.

7. After Crash

Communication of a child's 8 presence and disposition in the interior
of the vehicle, as well as data originating from the electronic unit
380 of an ICSS 38, and the vehicle owner attributes.

8. Driver Condition

Warning signal emitted upon detection of the driver's 12 condition as
being either one of both, or both, lacking alertness and intoxication.

TABLE 1B-continued

During Ride Operations
Table 1B—Protection Envelope—Cycle of Operation
of a Vehicle: During Ride 9. Driving Under certain predetermined conditions—_Warning signal emitted
upon detection of inappropriate driving such as determined under
predetermined conditions by driving assisting applications like lane
departure and lane Departure.

10. Child comfort

Moderate a desirable environment air temperature relative to the
child's 8 presence and disposition in the interior of the vehicle.

11. Secondhand Smoke

Warning signal emitted upon detection of the child's 8 presence/age or
smoke to warn the driver 12 that smoking is prohibited inside the vehicle
6.

12. V-V-communication

Trigger via a V-V communication interface to communicate that
"child(ren) is/are present in the vehicle 6".

13. Run-over accidents

Child parking alert

14. Channeling information and services

Triggering a notification device to communicate the presence of a child
8 in the vehicle 6 to remote station(s). In response, travel, safety,
advisory, emergency and entertainment related data are directed and sent
to the vehicle.

15. Entertainment

Channeling "entertainment programs" signal to the vehicle seat VSj
and or ICSS 380 installed Infotaint devices.

TABLE 1C

Parked Mode Operations
Table 1C—Protection Envelope—Cycle of Operation
of a Vehicle: Parked Mode 16. Prevention of a child from being left unattended in a parked vehicle All ignition modes: accessory-mode, ignition on, ignition off.
Internal warning signal: Audio-visual + prevention of vehicle key
removal.
External warning signal: Audio-visual + disablement of vehicle 6
locking.
Allow disablement of warning signals by providing a "child is
supervised" input command.
Disable from operation of power accessories such as the roof-panel
switch, the power window switch, and the door opening handle.
Disconnect the power supply to the Cigarette Lighter.

17. Prevention of Child gaining access to the vehicle

Doors locking embodiment

18. Prevention of vehicle 6 from being accidently set-into-motion

Regulating the operation of a brake-to-shift interlock, a brake
transmission interlock, and a key interlock application relative
to the indicator (14) provided data.

19. Trunk entrapment

Warning signal emitted upon detection of a triggering of an interior
trunk release apparatus, to indicate the detection of a child's
8 presence inside the trunk compartment of the vehicle 6.

20. Prevention of set-on-fire accidents

Permanently disable the power supply
to the cigarette lighter

21. Event data recording prior to, during, and after a ride

Recording a predetermined set of child related data

In FIG. 6, reference is made to at vehicle seat VS having a seat belt integrated with an Intelligent buckle IB 14 and an ICSS 38. FIG. 6 shows the indicator 14 being integrated into the Intelligent buckle IB 14. In other embodiments, further elements of the seat belt system of a vehicle's seat VS may be integrated and provide the features of an indicator 14, such as for example, but not shown in the Figs., the buckle tongue, the belt webbing, or the seat belt D-ring connection to the body of the vehicle 6. The Intelligent buckle IB 14 is designed to allow the user 12 to enter input instruction(s) directly into an occupant presence indicator IB2, shown in FIG. 6. Alternatively, data from the electronic unit 380 is communicated via a vehicle interface 4j allowing connection to a child seat interface 384 of an ICSS 38, which has the features of an indicator 14. Both the Intelligent Buckle IB 14 and the ICSS 38 may be coupled in wire or wireless communication to the control module 18.

An ICSS 38 equipped with a child-seat interface 384 may allow its presence and/or state of occupancy to be recognized by the control module 18 and by the equipment elements 20. When a child safety seat is an ICSS 38, then it is adapted to fully identify itself for recognition to the control module 18 and to the equipment elements 20.

An ICSS 38 is described in detail in the International Application No. PCT/IL2007/001625 to the same applicant, which application is incorporated herewith in whole by reference An Intelligent buckle is described in detail in Israel Patent Application No. 181390, to the same applicant, which application is incorporated herewith in whole by reference.

It is assumed that a within the norm adult passenger is not required to enter any indication into the Intelligent Buckle IB 14, but has just to buckle the seat belt of the vehicle seat VS.

The present embodiments, methods, and devices enable further refinement of the systems 10 installed in a vehicle 6. For example, the indicator 14 is also effective for theft-thwarting purposes for a vehicle 6 parked in a home driveway. Furthermore, entering the number of children 8 riding in the vehicle 6 in an indicator 14 allows the implementation of additional services, not necessarily linked to safety issues. Thus, a remote station might communicate services related or not to child-safety.

In summary, the description hereinabove relates to a method for the implementation of a system and to a system 10 that is operated by at least one user 12, configured to provide an integrative protection suite, or protection envelope, in response to the complete cycle of operation of a vehicle 6, for protecting at least one child passenger 8 from potential danger associated with the vehicle 6. The vehicle 6 may have equipment elements 20 including a plurality of sensors 22, a plurality of operable devices 24, and a plurality of alert systems (26) useful for providing at least one warning signal. The method and the system 10 include at least one indicator 14 operatively coupled to the equipment elements, and adapted to receive input commands, a report module 16 operatively coupled to the equipment elements and adapted to sample and report a status condition of each one of the equipment elements, and a control module 18 operatively coupled to the at least one indicator, to the report module, and to the equipment elements, and adapted to control, manage, and operate the system. The control module 18 is configured to receive input commands from the at least one indicator 14, to receive the status condition from the report module, to execute control programs responsive to information received from the at least one indicator and from the report module, and to control activation and deactivation of the system.

INDUSTRIAL APPLICABILITY

The present application is applicable in the transportation industry, where passengers are restrained to seats, such as for example in airplanes and cars.

It will be appreciated by persons skilled in the art, that the present claimed invention is not limited to what has been particularly shown and described hereinabove. The present claimed invention discloses a set of unique child-safety solutions to confront multiple hazards to which a child is potentially exposed and provides a system that manages the unique child-safety solutions in a holistic fashion. Rather, the scope of the present invention is defined by the appended claims and includes both combinations and subcombinations of the various features described hereinabove as well as variations and modifications thereof, which would occur to persons skilled in the art upon reading the foregoing description. For example, additional equipment 20 may be coupled to the vehicle 6, providing more child protection options. In addition, enhanced communication systems emitting data to remote monitoring stations, or event collection stations, and receiving data therefrom, may also be adapted to provide child-related and other protection services.

The invention claimed is:

1. A system operated by at least one user, for protecting at least one child from potential danger associated with a vehicle, the vehicle having equipment elements including:
   a plurality of sensors,
   a plurality of operable devices, and
   a plurality of alert systems useful for providing at least one warning signal, the system comprising:
   at least one indicator operatively coupled to the equipment elements, and adapted to receive input commands,
   a report module operatively coupled to the equipment elements and adapted to sample and report a status condition of each one of the equipment elements,
   a control module having a processor operating in association with a memory adapted for storing commands and computer programs, wherein an input command received by the at least one indicator is selected to be stored in memory as either one of both a command stored for one drive only and a command stored for more than one drive of the vehicle, and wherein the control module is operatively coupled to the at least one indicator, to the report module, and to the equipment elements, and adapted to control, manage, and operate the system, the control module being configured to:
   receive input commands from the at least one indicator,
   receive the status condition from the report module,
   execute control programs responsive to information received from the at least one indicator and from the report module, and
   control activation and deactivation of the system.

2. The system according to claim 1, wherein:
   the at least one child is a child selected alone and in combination from a group consisting of a child as a passenger of the vehicle and a child outside and adjacent the vehicle, and
   the system being operative and configured to provide an integrative protection suite, or protection envelope, in response to a complete cycle of operation of the vehicle including prior to a ride, and during the ride, when approaching a high-risk parking zone, and when the vehicle is parked.

3. The system according to claim 1, wherein:
the at least one indicator is configured to accept input commands selected alone and in combination from a group consisting of:
input commands related to a child's presence in the vehicle, input commands related to a specific vehicle seat VSj occupied by the child, input commands from an electronic unit of an ICSS, and input commands indicating vehicle owner attributes, and
the equipment elements being operative to respond to the received input commands are selected alone and in combination from a group of equipment elements consisting of category A, category B, category C, and category D.

4. The system according to claim 1, wherein:
the at least one child is protected from potential dangers selected alone and in combination from a group consisting of dangers resulting from driver's errors, dangers resulting from improper driver's behavior, dangers resulting from the operative systems of the vehicle, and dangers resulting from misuse of the child safety seat and of an intelligent child safety seat.

5. The system according to claim 1, wherein:
the control module is configured to perform at least one command operation selected alone and in combination from a group consisting of:
command and control of at least one element out of the equipment elements,
command detection of a driver's errors including alerting, warning, and instructing the driver to correct errors,
command detection of potential hazards including alerting, warning, and instructing the driver to avoid exposure to the potential hazards,
command detection of an incorrect use or misuse of a device to automatically override signals attributed to incorrect use or misuse of the device,
command a check for detection of mutual compatibility between a seated child with respect to a specific ICSS in which the at least one child is seated, to a specific vehicle seat VSj, and to the vehicle,
command detection of misuse of the ICSS comprising warning the driver of inadequate child safety seat installation, including advising the driver to initiate a check regarding eligibility of the child to be restrained in a booster seat,
command detection of improper driver behavior including advising the driver to take appropriate corrective action when necessary,
command control of communication with nearby riding vehicles,
command channeling of services to at least one of the driver and the at least one child, and
command operation of the system prior to a ride and during the ride of the vehicle, when approaching a high-risk parking zone and when the vehicle is parked.

6. The system according to claim 1, wherein:
the system for protecting the at least one child occupying an identified passenger seat VSj performs at least one operation of:
automatic disablement of an interior door-opening-handle and of a power window-switch in response to at least one of both a signal commanding locking of all the doors of the vehicle, and a dedicated signal command,
control of either one of both airbag reduced speed/size, and airbag shape of deployment including suppression of deployment of airbag(s) associated with the identified passenger seat,
control pre-tension of belt force applied to the identified passenger seat prior to an unavoidable collision,
automatic communication with a crash notification system response center to report presence of the at least one child,
activation of an alert signal to remind a driver that the at least one child is left unattended in the vehicle when the vehicle resides in parked mode,
inclusion of a child's presence message in a vehicle-to-vehicle communication protocol,
activation of a child-parking alert when appropriate,
activation of a doors-left-unlocked alert when appropriate,
override of signals attributed to incorrect use or to misuse of devices by a user,
detection of driver errors including provision of alerts, warnings, instructions and guidance advising correction of driver errors,
warning the driver against smoking in an interior of the vehicle,
advising the driver to initiate a check to determine if the at least one child is eligible for restraint in a booster seat,
moderate operation(s) of climate control device(s), cooperate with driving assistance systems and driver condition warning systems,
channeling of services to at least one of the driver and the at least one child,
control of vehicle's door locks to prevent at least one child from gaining access to the vehicle when parked,
disconnection of power to a cigarette lighter to prevent accidental setting on fire of the vehicle,
notifying the driver of activation of an interior trunk-lid release apparatus,
recording of a predetermined set of child-related-data to enable accident inquiry,
checking for mutual compatibility between the child and specific an ICSS into which the child is seated, the specific vehicle seat, and the vehicle, and
applying available data to operate at least one device selected from a group consisting of a key-interlock, a brake-to-shift interlock, and a transmission interlock, to prevent accidental setting into motion of the vehicle.

7. The system according to claim 1, wherein:
the at least one indicator is configured to return feedback signals selected alone and in combination from a group consisting of visible, audible, and tactile signals.

8. The system according to claim 1, wherein:
the at least one indicator is selected alone and in combination from a group consisting of indicators permanently coupled to the vehicle, indicators removable from the vehicle, portable removable indicators, and remotely operating indicators.

9. The system according to claim 1, wherein:
the at least one indicator is configured as a module selected alone and in combination from a group consisting of centralized, distributed, and remote indicators.

10. The system according to claim 1, wherein:
the at least one indicator is configured to receive input commands selected alone and in combination from a group consisting of manual input commands, automatic input commands, vocal input commands, memory-stored input commands, memory-stored data and remotely communicated input commands, the at least one indicator being coupled in at least one of both single and bi-directional interactive communication with the control module, and the at least one indicator communicates in a mode selected from a group consisting of wire communication, wireless communication, and both wire and wireless communication.

11. The system according to claim 1, wherein:
the at least one indicator is integrated into at least one device selected alone and in combination from a group consisting of electrically portable entry devices, driver message centers, navigation systems, notification systems, seat belt restraints, parking imaging and observation systems, wireless communication modules, child safety seats, and intelligent child safety seats, and
the at least one indicator is integrated into devices including devices originally inherent to the vehicle and devices added to the vehicle in retrofit.

12. The system according to claim 11, wherein:
an interface operatively coupled to the control module is adapted to receive input commands entered by a user into an indicator integrated in a child safety seat, and
disposition of the interface is selected from a group of dispositions consisting of a passenger seat, a passenger seat restraint, and close proximity to the passenger seat.

13. The system according to claim 1, wherein:
the at least one indicator is adapted to receive input commands entered by a user selected alone and in combination from a group consisting of the driver of the vehicle and another person.

14. The system according to claim 1, wherein:
the control module is operable by interactive communication between the at least one indicator and the user.

15. The system according to claim 1, wherein:
the control module is implemented for operation in a mode selected from the group consisting of central control, hybrid control, and decentralized control.

16. The system according to claim 1, wherein:
the control module is configured to control activation and deactivation of at least one selected element out of the plurality of equipment elements.

17. The system according to claim 1, wherein:
at least one element out of the equipment elements is configured to operate in association with input commands received by the at least one indicator.

18. The system according to claim 1, wherein:
the equipment elements are controlled by a processor selected alone and in combination from a group consisting of a processor dedicated to the vehicle's equipment elements, and a processor dedicated to the control module.

19. The system according to claim 1, wherein:
the at least one warning signal is selected alone and in combination from a group consisting of visual signals, audible signals, tactile signals, and signals emitted to a remote station,
the at least one warning signal is configured as at least one of emission of "smoking forbidden" signal, "child safety seat product recall signal" prevention of the removal of the ignition key and disablement of the vehicle's door locking mechanism when the child is registered as a passenger of the vehicle, and
the alert systems include booster seat warning labels indicating child height limits.

20. The system according to claim 1, wherein:
the report module is configured as a module selected alone and in combination from a group consisting of a stand-alone module, a module integrated as one single unit into another element of the equipment elements, and a module embedded in a plurality of elements of the equipment elements.

21. A method for implementing a system operated by at least one user, for protecting at least one child from a potential danger associated with a vehicle, the vehicle having equipment elements including:
a plurality of sensors,
a plurality of operable devices, and
a plurality of alert systems useful for providing at least one warning signal, the method comprising the steps of:
coupling operatively at least one indicator to the equipment elements, and adapting the at least one indicator to receive input commands,
coupling operatively a report module to the equipment elements and adapting the report module to sample and report a status condition of each one of the equipment elements,
providing a control module having a processor operating in association with a memory adapted for storing commands and computer programs, wherein an input command received by the at least one indicator is selected to be stored in memory as either one of both a command stored for one drive only and a command stored for more than one drive of the vehicle, and wherein the control module is operatively coupled to the at least one indicator, to the report module, and to the equipment elements, and adapted to control, manage, and operate the system, the control module being configured for:
receiving input commands from the at least one indicator,
receiving a status condition from the report module,
executing control programs responsive to information received from the at least one indicator and from the report module, and
controlling activation and deactivation of the system.

22. The method according to claim 21, wherein:
the at least one child is a child selected alone and in combination from a group consisting of a child as a passenger of the vehicle and a child outside and adjacent the vehicle, and
the method is operative and configured to provide an integrative protection suite, or protection envelope, prior to a ride, and during the ride, when approaching a high-risk parking zone, and when the vehicle is parked.

23. The method according to claim 21, wherein:
the at least one indicator is configured to accept input commands selected alone and in combination from a group consisting of:
input commands related to a child's presence in the vehicle, input commands related to a specific vehicle seat VSj occupied by the child, input commands from an electronic unit of an ICSS, input commands indicating vehicle owner attributes, and
the equipment elements being operative to respond to the received input commands are selected alone and in combination from a group of equipment elements consisting of category A, category B, category C, and category D.

24. The method according to claim 21, wherein:
the at least one child is protected from potential dangers selected alone and in combination from a group consisting of dangers to the child resulting from driver's errors, dangers to the child resulting from improper driver's behavior, dangers to the child resulting from the operative systems of the vehicle, and dangers resulting from misuse of the child safety seat and of an intelligent child safety seat.

25. The method according to claim 21, wherein:

operation of the control module further comprises the steps of:

executing commands and receiving commands to operate and control operation of at least one element out of the equipment elements, detecting a driver's errors and alerting, warning, and instructing the driver to correct errors, detecting potential hazards including alerting, warning, and instructing the driver to avoid exposure to the potential hazards, detecting incorrect use or misuse of a device to automatically override signals attributed to incorrect used or misuse of the device, checking for detection of mutual compatibility between a seated child and with respect to a specific ICSS in which the child is seated, to a specific vehicle seat VSj, and to the vehicle, detecting misuse of the ICSS comprising warning the driver of inadequate child safety seat installation, including advising the driver to initiate a check of eligibility of the child to be restrained in a booster seat, detecting improper driver behavior including advising the driver to take appropriate corrective action when necessary, controlling communication with nearby riding vehicles, channeling services to at least one of the driver and the child, and operating the method prior to a ride and during the ride of the vehicle, when approaching a high-risk parking zone, and when the vehicle is parked.

26. The method according to claim 21, wherein:

associating the at least one child as the passenger of an identified passenger seat VSj, the method comprising the steps of:

providing automatic disablement of an interior door-opening-handle and of a power window-switch in response to at least one signal selected from a group consisting of a signal commanding locking of all doors of the vehicle, and a dedicated signal command, providing control of either one of both airbag reduced speed/size and airbag shape of deployment including suppressing deployment of airbag(s) associated with the identified passenger seat, applying appropriate pre-tension of belt force to the identified passenger seat prior to detection of an unavoidable collision, communicating automatically with a crash notification system response center to report presence of the at least one child, activating an alert signal to remind a driver that the at least one child is left unattended in the vehicle when the vehicle resides in parked mode, including a child's presence message in a vehicle-to-vehicle communication protocol, activating a child-parking alert when appropriate, activating a doors-left-unlocked alert when appropriate, overriding signals attributed to incorrect use or misuse of devices by a user, detecting driver errors and providing alerts, warnings, instructions and guidance advising correction of driver errors, warning the driver against smoking in an interior of the vehicle, advising the driver to initiate a check to determine if the child is eligible for restraint in a booster seat, moderating operation(s) of climate control device(s), cooperating with driving assistance systems and driver condition warning systems, channeling services to at least one of the driver and the at least one child, controlling the vehicle's door locks to prevent a child from gaining access to the vehicle when parked, controlling disconnection of power to a cigarette lighter to prevent accidental setting on fire of the vehicle, notifying the driver of activation of an interior trunk-lid release apparatus, recording of a predetermined set of child-related-data to enable accident inquiry, checking for detection of mutual compatibility between a seated child and with respect to a specific ICSS in which the child is seated, to a specific vehicle seat VSj, and to the vehicle, applying available data to operate at least one device selected from a group consisting of a key-interlock, a brake-to-shift interlock, and a transmission interlock, to prevent accidental setting into motion of the vehicle.

27. The method according to claim 21, wherein:

the at least one indicator is configured to return feedback signals selected alone and in combination from a group consisting of visible, audible, and tactile signals.

28. The method according to claim 21, wherein:

the at least one indicator is selected alone and in combination from a group consisting of indicators permanently coupled to the vehicle, indicators removable from the vehicle, portable removable indicators, and remotely operating indicators.

29. The method according to claim 21, wherein:

the at least one indicator is configured as a module selected alone and in combination from a group consisting of centralized, distributed, and remote indicators.

30. The method according to claim 21, wherein:

the at least one indicator is configured to receive input commands selected alone and in combination from a group consisting of manual input commands, automatic input commands, vocal input commands, memory-stored input commands, memory-stored data and remotely communicated input commands, the at least one indicator being coupled in at least one of both single and bi-directional interactive communication with the control module, and the at least one indicator communicates in a mode selected from a group consisting of wire communication, wireless communication, and both wire and wireless communication.

31. The method according to claim 21, wherein:

the at least one indicator is integrated into devices selected alone and in combination from a group consisting of electrically portable entry device, driver message center, navigation system, notification system, seat belt restraints, parking imaging and observation system, wireless communication module, child safety seat, and intelligent child safety seat, and the at least one indicator is integrated into devices including devices originally inherent to the vehicle and devices added to the vehicle in retrofit.

32. The method according to claim 31, wherein:

an interface operatively coupled to the control module is adapted to receive input commands entered by a user into an indicator integrated in a child safety seat, and disposition of the interface is selected from a group of dispositions consisting of a passenger seat, a passenger seat restraint, and close proximity to the passenger seat.

33. The method according to claim 21, wherein:
the at least one indicator is adapted to receive input commands entered by a user selected alone and in combination from a group consisting of the driver of the vehicle and another person.

34. The method according to claim 21, wherein:
the control module is operable by interactive communication between the at least one indicator and the user.

35. The method according to claim 21, wherein:
the control module is implemented for operation in a mode selected from a group consisting of central control, hybrid control, and decentralized control.

36. The method according to claim 21, wherein:
the control module is configured to control activation and deactivation of at least one selected element out of the plurality of equipment elements.

37. The method according to claim 21, wherein:
at least one element out of the equipment elements is configured to operate in association with input commands received by the at least one indicator.

38. The method according to claim 21, wherein:
the equipment elements are controlled by a processor selected alone and in combination from a group consisting of a processor dedicated to the vehicle's equipment elements, and a processor dedicated to the control module.

39. The method according to claim 21, wherein:
the at least one warning signal is selected alone and in combination from a group consisting of visual signals, audible signals, tactile signals, and signals emitted to a remote station,
the at least one warning signal is configured as at least one of emission of "smoking forbidden" signal, "child safety seat product recall signal" prevention of the removal of the ignition key and disablement of the vehicle's door locking mechanism when the child is registered as a passenger of the vehicle, and
the alert systems include booster seat warning labels indicating child height limits.

40. The method according to claim 21, wherein:
the report module is configured as a module selected alone and in combination from a group consisting of a stand-alone module, a module integrated as one single unit into another element of the equipment elements, and a module embedded in a plurality of elements of the equipment elements.

41. The method according to claim 21, wherein:
the at least one indicator provides the control module with first signals indicative of received input commands,
the equipment elements provide the control module with second signals indicative of detection of an event triggering the operation of the method,
the control module accepts first signals and second signals as a danger signal indicative of a child being exposed to the danger, and
the control module executes control programs responsive to received first and second signals to control, manage and operate the method.

42. The method according to claim 21, wherein:
the at least one indicator is configured to provide the control module with first signals indicative of presence of a child in a passenger seat,
a buckled passenger seat belt provides the control module with second signals indicative of presence of a passenger, and
the control module accepts absence of first signals and presence of second signals as a default signal indicative of an adult passenger being buckled in the passenger seat.

43. The method according to claim 21, wherein:
input commands into the at least one indicator are selected alone and in combination from a group consisting of:
child's presence in the vehicle, child's absence from the vehicle, child being under adult supervision,
location of a child safety seat or of an ICSS in a vehicle seats $VS_j$ of the vehicle,
input commands from the electronic unit of the ICSS to provide data selected from a group consisting of ID data of the identification module, sensor signal data of the sensor module, and operative device signal data of a devices module,
vehicle owner attributes including data regarding family and personal information, number and age of children usually being driven in the vehicle, child identity data including names, age, birth date, certain medical condition information, contact information, and location of high-risk parking zones;
input commands from remote stations including data regarding product recall announcement for a specific ICSS model, traffic conditions, safety warnings, and travel and advisory data;
input commands regarding presence and vehicle seat $VS_j$ occupancy by out of norm adults including data regarding presence of a pregnant woman, presence of incapacitated adult, presence of small stature adult and presence of an elderly person, and
input commands regarding the activation status of the at least one indicator.

* * * * *